United States Patent
Eguchi et al.

(10) Patent No.: US 9,096,748 B2
(45) Date of Patent: Aug. 4, 2015

(54) THERMOPLASTIC ELASTOMER COMPOSITION AND MOLDED PRODUCTS USING THE SAME

(75) Inventors: Yutaka Eguchi, Tokyo (JP); Shinichi Shibayama, Tokyo (JP); Yuki Mori, Tokyo (JP); Kaori Komatsu, Yokohama (JP); Hajime Matsuura, Yokohama (JP)

(73) Assignees: Asahi Kasei Chemicals Corporation, Tokyo (JP); Nissan Motor Company Limited, Kanagawa (JP)

( * ) Notice: Subject to any disclaimer, the term of this patent is extended or adjusted under 35 U.S.C. 154(b) by 231 days.

(21) Appl. No.: 13/702,047

(22) PCT Filed: Jun. 9, 2011

(86) PCT No.: PCT/JP2011/063274
§ 371 (c)(1),
(2), (4) Date: Feb. 14, 2013

(87) PCT Pub. No.: WO2011/155571
PCT Pub. Date: Dec. 15, 2011

(65) Prior Publication Data
US 2013/0209787 A1  Aug. 15, 2013

(30) Foreign Application Priority Data

Jun. 9, 2010  (JP) ................................. 2010-132285

(51) Int. Cl.
| C08L 23/10 | (2006.01) |
| B32B 25/08 | (2006.01) |
| B32B 27/08 | (2006.01) |
| B32B 27/22 | (2006.01) |
| B32B 27/28 | (2006.01) |
| B32B 27/32 | (2006.01) |
| C08L 53/02 | (2006.01) |
| C08L 83/04 | (2006.01) |
| B60R 13/02 | (2006.01) |

(52) U.S. Cl.
CPC .................. *C08L 23/10* (2013.01); *B32B 25/08* (2013.01); *B32B 27/08* (2013.01); *B32B 27/22* (2013.01); *B32B 27/28* (2013.01); *B32B 27/32* (2013.01); *C08L 53/025* (2013.01); *C08L 83/04* (2013.01); *B60R 13/0256* (2013.01); *Y10T 428/249992* (2015.04); *Y10T 428/31507* (2015.04); *Y10T 428/31663* (2015.04)

(58) Field of Classification Search
USPC ................ 524/505; 428/319.7, 220, 447, 412
See application file for complete search history.

(56) References Cited

U.S. PATENT DOCUMENTS

| 3,281,383 A | 10/1966 | Zelinski et al. |
| 4,501,857 A | 2/1985 | Kishimoto et al. |
| 4,603,155 A | 7/1986 | Muramori et al. |
| 4,673,714 A | 6/1987 | Kishimoto et al. |
| 5,474,841 A | 12/1995 | Matsuki et al. |
| 5,502,095 A * | 3/1996 | Ueshima et al. ............... 524/269 |
| 6,033,770 A | 3/2000 | Matsuki et al. |
| 6,071,619 A | 6/2000 | De Winter |
| 2006/0016951 A1 | 1/2006 | Nash et al. |
| 2009/0137716 A1 * | 5/2009 | Furukawa et al. ............ 524/426 |

FOREIGN PATENT DOCUMENTS

| GB | 1436812 A | 5/1976 |
| JP | S36-019286 B | 10/1961 |
| JP | S42-008704 B1 | 4/1967 |
| JP | S43-006636 B1 | 3/1968 |
| JP | S43-017979 B | 7/1968 |
| JP | S46-032415 B | 9/1971 |
| JP | S48-002423 B | 1/1973 |
| JP | S48-004106 B | 2/1973 |
| JP | S49-036957 B | 10/1974 |
| JP | S56-028925 B2 | 7/1981 |
| JP | S59-166518 A | 9/1984 |
| JP | S60-037784 B2 | 8/1985 |
| JP | S60-0186577 A | 9/1985 |
| JP | S63-004776 B2 | 1/1988 |
| JP | S63-004841 B2 | 2/1988 |
| JP | H01-037970 B2 | 8/1989 |
| JP | H01-053851 B2 | 11/1989 |
| JP | H02-009041 B2 | 2/1990 |
| JP | H02-012733 B2 | 3/1990 |
| JP | 06-048221 A | 2/1994 |
| JP | H08-109219 A | 4/1996 |
| JP | 2517073 B2 | 7/1996 |
| JP | H10-500366 A | 1/1998 |
| JP | 10-067893 A | 3/1998 |
| JP | 11-130924 A | 5/1999 |
| JP | 2002-348433 A | 12/2002 |
| JP | 2003-176397 A | 6/2003 |
| JP | 2003-176497 A | 6/2003 |

(Continued)

OTHER PUBLICATIONS

Search Report issued in corresponding International Application No. PCT/JP2011/063274 dated Aug. 9, 2011.
Kolthoff et al., "Determination of Polystyrene in GR-S Rubber," Journal of Polymer Science, 1: 429-433 (1946).
Office Action issued in related Japanese Patent Application No. 2012-519430 dated Feb. 7, 2014.

*Primary Examiner* — James J Seidleck
*Assistant Examiner* — Deve E Valdez
(74) *Attorney, Agent, or Firm* — Morgan, Lewis & Bockius LLP

(57) ABSTRACT

An object of the present invention is to provide a thermoplastic elastomer composition having high molding fluidity, mechanical physical properties, and resistance to wear and providing a good appearance and feeling, and molded products using the same.

18 Claims, 5 Drawing Sheets

(56) References Cited

FOREIGN PATENT DOCUMENTS

| JP | 2005-179455 A | 7/2005 |
| JP | 2006-199952 A | 8/2006 |
| JP | 2009-256467 A | 11/2009 |

* cited by examiner

THERMOPLASTIC ELASTOMER COMPOSITION AND MOLDED PRODUCTS USING THE SAME

TECHNICAL FIELD

The present invention relates to a thermoplastic elastomer composition and molded products using the same. More specifically, the present invention relates to a thermoplastic elastomer composition, and sheets, automobile interior materials, laminates, and instrument panels using the same.

BACKGROUND ART

Conventionally, as methods for producing a surface material for automobile parts and home appliance OA parts, methods for producing a surface material have been proposed in which a composition comprising a vinyl chloride copolymer is formed into a sheet by calendering or extrusion, and the sheet is vacuum formed to obtain a vinyl chloride copolymer vacuum formed product (see Patent Document 1), and in which a sheet formed of a material comprising a polypropylene resin and an olefin-based thermoplastic elastomer is molded using a vacuum forming female mold having a crimped surface to obtain a surface layer (see Patent Document 2).

Moreover, a method for producing a synthetic resin surface body has been proposed in which a surface body is produced using a molding material of a powder thermoplastic synthetic resin by a slush molding method (see Patent Document 3) and a method for producing a crimped thermoplastic elastomer molded product has been proposed in which a thermoplastic elastomer powder comprising a polyolefin resin and an ethylene.α-olefin copolymer rubber is molten and applied to an inner surface of a metal mold for transferring a crimp to form the crimp on the surface of a molded product (see Patent Document 4). Further, a surface material produced by spraying using a urethane elastomer and a method for producing the surface material have been proposed (see Patent Document 5).

PATENT DOCUMENT

Patent Document 1: Japanese Patent Publication No. 60-037784
Patent Document 2: Japanese Patent Publication No. 63-004776
Patent Document 3: Japanese Patent Publication No. 02-012733
Patent Document 4: Japanese Patent No. 2517073
Patent Document 5: Japanese Patent Application Publication (Translation of PCT Application) No. 10-500366

SUMMARY OF THE INVENTION

Problems to be Solved by the Invention

Unfortunately, in the techniques described in Patent Documents 1 and 2, by extending the sheet by vacuum forming, the sheet has an uneven thickness, the embossed crimp is smoothed, the size of the crimp becomes larger, and the depth of the crimp becomes smaller. As a result, not only a feeling but also an appearance is inferior.

In the techniques described in Patent Documents 3 and 4, the amount of the powder to be applied to the mold varies according to a shape of the molded product and the molded product cannot have a uniform thickness. For this reason, the molded product includes some parts in which the feeling is inferior, or the surface of the molded product is difficult to be removed from the mold upon removal from the mold.

In the technique described in Patent Document 5, it is difficult to spray apply the urethane elastomer to a narrow portion. For this reason, the material is accumulated, the thickness of the molded product is unstable due to running of the solution, and the feeling is fluctuated.

Moreover, in order to accurately reproduce depression and projection patterns of the metal mold for transfer in the appearance of the product, the surface material needs to have high crimp reproductivity. It is thought that injection molding using a steel mold is used as a method for enhancing crimp reproductivity. For example, when a surface material for an instrument panel, which is an automobile interior material, is molded, the resin material used for the automobile interior material in the conventional art has low molding fluidity. For this reason, in the case where a molded product has a complicated shape or has a large surface area, the resin material cannot be completely filled without voids into the metal mold. Further, in the case where a material having high molding fluidity is used, mechanical physical properties such as elongation properties and tear strength are reduced, which is problematic. Thus, it is difficult to satisfy the physical properties demanded of the instrument panel such as molding fluidity, mechanical physical properties, appearance, feeling, and resistance to wear.

The present invention has been made in consideration of such circumstances. An object of the present invention is to provide a thermoplastic elastomer composition having high molding fluidity, mechanical physical properties, and resistance to wear and providing a good appearance and feeling, and molded products using the same.

Means for Solving the Problem

The present inventors found out that the problems above can be solved by a thermoplastic elastomer composition obtained by crosslinking a composition comprising a specific amount of a hydrogenated product of a block copolymer having at least one block mainly including a specific amount of (A) a polypropylene-based resin, a specific amount of (B) a conjugated diene monomer unit and at least one block mainly including a vinyl aromatic monomer unit, a specific amount of (C) a softening agent, and a specific amount of (D) a polyorganosiloxane, wherein specific conditions are satisfied. Thus, the present invention has been completed.

Namely, the present invention is as follows.

A thermoplastic elastomer composition obtained by crosslinking a composition comprising components (A) to (D) below:

[1] A thermoplastic elastomer composition obtained by crosslinking a composition comprising components (A) to (D) below:
(A) 100 parts by mass of a polypropylene-based resin,
(B) from 80 to 200 parts by mass of a hydrogenated product of a block copolymer having at least one block mainly including a conjugated diene monomer unit and at least one block mainly including a vinyl aromatic monomer unit,
(C) from 100 to 250 parts by mass of a softening agent, and
(D) from 5 to 20 parts by mass of polyorganosiloxane,
the thermoplastic elastomer composition satisfying conditions (1) to (5) below:
(1) a content of the vinyl aromatic monomer unit in the component (B) is from 30 to 80% by mass, (2) a melt flow rate (ASTM D1238, 230° C., load of 1.2 kg; MFR) is from 35 to 85 g/10 min, (3) a JIS A hardness is from 60 to 90, (4) a compression set (JIS K6262, 100° C., 22 hours) is from 30 to 70%, and (5) a tensile elongation at −30° C. is not less than 80%.

[2] The thermoplastic elastomer composition according to [1], further satisfying conditions (i) and (ii) below:

(i) a melt viscosity at a shear rate of 100/sec measured by a capillary rheometer is from 30 to 200 Pa·sec, and (ii) a melt viscosity at a shear rate of 1000/sec measured by a capillary rheometer is from 10 to 40 Pa·sec (wherein as a measurement condition of the melt viscosity measured by a capillary rheometer on the conditions (i) and (ii), a heating temperature is 230° C., a cylinder diameter is 9.55 mm, an orifice diameter is 1.0 mmφ, and an orifice length is 10 mm).

[3] The thermoplastic elastomer composition according to [1] or [2], wherein at least one tan δ peak temperature of the thermoplastic elastomer composition measured by dynamic viscoelastic analysis exits in the range of −25 to 40° C.

[4] The thermoplastic elastomer composition according to any one of [1] to [3], wherein the component (A) in the thermoplastic elastomer composition obtained by crosslinking has a weight average molecular weight, measured by gel permeation chromatography (GPC) using o-dichlorobenzene as a solvent, in the range of $5.0 \times 10^4$ to $2.0 \times 10^5$ in terms of polystyrene.

[5] The thermoplastic elastomer composition according to any one of [1] to [4], wherein the component (D) has a kinematic viscosity at 25° C. specified in JIS Z8803 of not less than 5000 cSt.

[6] The thermoplastic elastomer composition according to any one of [1] to [5], wherein the block mainly including a conjugated diene monomer unit in the component (B) is a copolymer block mainly including a conjugated diene monomer unit and including a vinyl aromatic monomer unit.

[7] The thermoplastic elastomer composition according to any one of [1] to [6], further comprising from 40 to 80 parts by mass of an ethylene.α-olefin-based copolymer including an ethylene unit and a unit of α-olefin having 3 to 20 carbon atoms.

[8] An injection molded product, comprising the thermoplastic elastomer composition according to any one of [1] to [7].

[9] A sheet comprising the injection molded product according to [8].

[10] An automobile interior material comprising the injection molded product according to [8].

[11] The automobile interior material according to [10], wherein an average thickness is not more than 2 mm, and a surface area is not less than 1000 cm².

[12] A laminate, comprising a layer including the automobile interior material according to [10] or [11], and a layer including a core material, laminated on the layer including the automobile interior material, wherein the core material is at least one selected from the group consisting of polypropylene, acrylonitrile.butadiene.styrene (ABS) resin, polycarbonate/acrylonitrile.butadiene.styrene alloy (PC/ABS alloy), and modified polyphenylene ether resin.

[13] The laminate according to [12], further comprising a layer including a foaming material provided between the layer including the automobile interior material and the layer including a core material.

[14] An instrument panel, comprising the laminate according to [12] or [13].

Advantageous Effects of the Invention

The present invention can provide a thermoplastic elastomer composition having high molding fluidity, mechanical physical properties, and resistance to wear and providing a good appearance and feeling, and molded products using the same.

MODES FOR CARRYING OUT THE INVENTION

Figure 1:
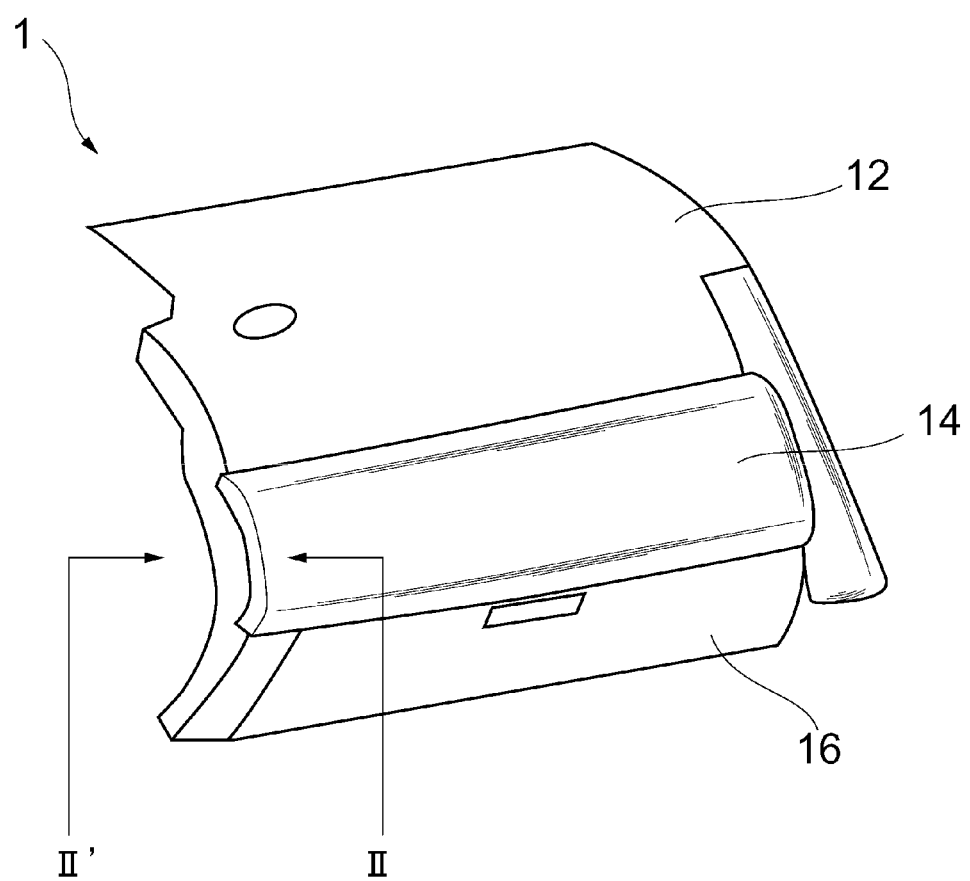
FIG. 1 shows a perspective view of one embodiment of an instrument panel according to the present embodiment.

Hereinafter, an embodiment for implementing the present invention (hereinafter, simply referred to as "the present embodiment") will be described in detail, when necessary, referring to the drawings. The present embodiment below is only an example for describing the present invention, and it is not intended the present invention be limited to the content below. Moreover, the present invention can be properly modified within the scope of the gist, and implemented.

The thermoplastic elastomer composition according to the present embodiment (hereinafter, simply referred to as a "composition" in some cases) is a thermoplastic elastomer composition obtained by crosslinking a composition comprising components (A) to (D) below, the composition comprising:

(A) 100 parts by mass of a polypropylene-based resin, (B) from 80 to 200 parts by mass of a hydrogenated product of a block copolymer having at least one block mainly including a conjugated diene monomer unit and at least one block mainly including a vinyl aromatic monomer unit, (C) from 100 to 250 parts by mass of a softening agent, and (D) from 5 to 20 parts by mass of polyorganosiloxane, the thermoplastic elastomer composition satisfying conditions (1) to (5) below:

(1) a content of the vinyl aromatic monomer unit in the component (B) is from 30 to 80% by mass, (2) a melt flow rate (230° C., load of 1.2 kg; MFR) is from 35 to 85 g/10 min, (3) a JIS A hardness is from 60 to 90, (4) a compression set (JIS K6262, 100° C., 22 hours) is from 30 to 70%, and (5) a tensile elongation at −30° C. is not less than 80%.

The thermoplastic elastomer composition according to the present embodiment has high molding fluidity, mechanical physical properties, and resistance to wear and providing a good appearance and feeling. There is a demand for development of a thermoplastic elastomer composition allowing efficient production of a thin molded product with a large area by injection molding. Because of its poor molding fluidity, the thermoplastic elastomer composition in the conventional art is not suitable for a material used for producing a molded product having a complicated shape such as automobile interior materials by injection molding. For example, there are attempts to improve the molding fluidity by blending a large amount of a polypropylene-based resin with a thermoplastic elastomer composition, but the hardness and compression set of the obtained molded product are insufficient and not suitable for practical use. In addition, even if a molded product is obtained by controlling the injection molding condition, the appearance, rubber properties, feeling, and mechanical strength of the obtained molded product are insufficient. Particularly, the automobile interior material is widely used as an outer surface material for various automobile parts, and needs to have high resistance to wear.

Then, first, the present inventors made various studies about the techniques to improve the molding fluidity. For example, in the case of the thermoplastic elastomer composition used in the conventional art, usually, the thermoplastic elastomer composition has a large content of a rubber component of not less than 50% by mass. For this reason, even if the fluidity of a polypropylene-based resin as a matrix component is increased, improvement in the fluidity of a rubber particle as an island component is an obstacle to prevent sufficient fluidity from being obtained. As a result of extensive research of the production condition and the like, the present inventors have found out that in an extruder, by blending an organic peroxide or the like, the molecular weight of the polypropylene-based resin before crosslinking and that after crosslinking are controlled to fall within predetermined ranges respectively; thereby, the rubber component is sufficiently crosslinked, and formed into a fine particle. Then, a thermoplastic elastomer composition according to the present embodiment that satisfies the specific conditions such as (1) to (5) is successfully obtained. It was also found out that the thermoplastic elastomer composition has unexpectedly high molding fluidity, mechanical physical properties, and resistance to wear and providing a good appearance and feeling.

Component (A)

The component (A) is a polypropylene-based resin. The polypropylene-based resin here refers to homopolymers of propylene and copolymers of propylene and another monomer copolymerizable with propylene. From the viewpoint of mechanical physical properties, homopolypropylenes are preferable. Copolymers of propylene and ethylene and the like can also be used.

Specific examples of the propylene copolymer may include copolymers of propylene and another α-olefin such as ethylene, butene-1, pentene-1, and hexene-1. The structure of the propylene copolymer is not particularly limited, and may be any of a block copolymer and a random copolymer.

In the present embodiment, the melt flow rate (MFR) at 230° C. and a load of 2.16 kg of the polypropylene-based resin (A) contained in the composition before crosslinking is not particularly limited. Preferably, the melt flow rate is from 0.2 to 5 g/10 min. At an MFR of not more than 5 g/10 min, the thermoplastic elastomer composition and molded products using the thermoplastic elastomer composition have higher heat resistance and mechanical physical properties. At an MFR of not less than 0.2 g/10 min, higher molding fluidity can be obtained to give high moldability to the molded products. Particularly, from the viewpoint of balance between fluidity and mechanical strength after the crosslinking reaction, the MFR of the component (A) is more preferably from 0.2 to 3 g/10 min. Here, the MFR can be measured according to ASTM D1238.

In the polypropylene-based resin (A) contained in the composition before crosslinking, the weight average molecular weight measured by gel permeation chromatography (GPC) using o-dichlorobenzene as a solvent is preferably from $5.0 \times 10^5$ to $1.0 \times 10^6$, and more preferably from $5.0 \times 10^5$ to $9.0 \times 10^5$ in terms of polystyrene. At a weight average molecular weight of the component (A) before crosslinking of not less than $5.0 \times 10^5$, thermoplastic elastomer composition and molded products using the thermoplastic elastomer composition have higher heat resistance and mechanical physical properties. At a weight average molecular weight of the component (A) before crosslinking of not more than $1.0 \times 10^6$, higher molding fluidity can be obtained to give higher moldability.

The polypropylene component (A) contained in the thermoplastic elastomer composition according to the present embodiment after crosslinking has a weight average molecular weight, measured by GPC using o-dichlorobenzene as a solvent, of preferably from $5.0 \times 10^4$ to $2.0 \times 10^5$, and more preferably from $7.0 \times 10^4$ to $1.5 \times 10^5$ in terms of polystyrene. If the weight average molecular weight of the component (A) after crosslinking is within the range, much higher molding fluidity, crimp reproductivity, heat resistance, and mechanical physical properties are demonstrated.

Component (B)

The component (B) is a hydrogenated product of a block copolymer having at least one block mainly including a conjugated diene monomer unit and at least one block mainly including a vinyl aromatic monomer unit. Here, the "vinyl aromatic monomer unit" means a structural unit of a polymer resulting from polymerization of a vinyl aromatic compound as a monomer, and the structure is a molecule structure in which two carbons in a substituted ethylene group derived from a substituted vinyl group are bonding sites. The "conjugated diene monomer unit" means a structural unit of a polymer resulting from polymerization of a conjugated diene as a monomer, and the structure is a molecule structure in which two carbons in olefin derived from the conjugated diene monomer are bonding sites. The expression "mainly including" in the block copolymer means that the copolymer block may include the monomer unit derived from the conjugated diene monomer (or the vinyl aromatic monomer) in a proportion of not less than 50% by mass, preferably not less than 60% by mass, more preferably not less than 80% by mass in the copolymer block. For example, the block mainly including a conjugated diene monomer unit means a block including the monomer unit derived from the conjugated diene monomer in a proportion of not less than 50% by mass, preferably not less than 60% by mass, more preferably not less than 80% by mass in the block.

In the present embodiment, the vinyl aromatic monomer is not particularly limited, and examples thereof may include vinyl aromatic compounds such as styrene, α-methylstyrene, p-methylstyrene, divinylbenzene, 1,1-diphenylethylene, N,N-dimethyl-p-aminoethylstyrene, and N,N-diethyl-p-aminoethylstyrene. These may be used singly or in combinations of two or more. Among these, from the viewpoint of economy, styrene is preferable.

In the present embodiment, the conjugated diene monomer is a diolefin having a pair of conjugated double bonds, and examples thereof may include 1,3-butadiene (butadiene), 2-methyl-1,3-butadiene (isoprene), 2,3-dimethyl-1,3-butadiene, 1,3-pentadiene, 2-methyl-1,3-pentadiene, and 1,3-hexadiene. Among these, from the viewpoint of economy, butadiene and isoprene are preferable. These may be used singly or in combinations of two or more.

Disposition of the blocks in the hydrogenated product of a block copolymer in the present embodiment is not particularly limited, and suitable one can be properly used. For example, in the case where the polymer block including the aromatic vinyl monomer unit is represented by S and the polymer block including the conjugated diene monomer unit and/or its partially hydrogenated unit is represented by B, examples of the hydrogenated product of the block copolymer may include linear block copolymers represented by SB, $S(BS)_{n1}$ (wherein n1 is an integer of 1 to 3), $S(BSB)_{n2}$ (wherein n2 is an integer of 1 to 2), and copolymers represented by $(SB)_{n3}X$ (wherein n3 is an integer of 3 to 6; X represents a residue of a coupling agent such as silicon tetrachloride, tin tetrachloride, and a polyepoxy compound). Among these, linear block copolymers of an SB 2-block type (diblock), an SBS 3-block type (triblock), and an SBSB 4-block type (tetrablock) are preferable.

The content of the vinyl aromatic monomer unit in the component (B) is 30 to 80% by mass, preferably 40 to 80% by mass, and more preferably 50 to 70% by mass from the viewpoint of heat resistance and dispersibility. If the content of the vinyl aromatic monomer unit is not less than 30% by mass, the mechanical physical properties can be further improved. If the content of the vinyl aromatic monomer unit is not more than 80% by mass, low temperature properties can be further improved. The content of the vinyl aromatic monomer unit in the component (B) can be measured by nuclear magnetic resonance spectrometry (NMR).

The content of the vinyl aromatic monomer unit block in the component (B) is preferably not less than 10% by mass, and more preferably 10 to 40% by mass from the viewpoint of mechanical strength. Here, using the mass of the vinyl aromatic compound polymer block (wherein a vinyl aromatic compound polymer having an average polymerization degree of approximately 30 or less is excluded) obtained by a method in which using osmium tetroxide as a catalyst, a copolymer before hydrogenation is decomposed by oxidation using tert-butyl hydroperoxide (the method described in I. M. Kolthoff, et al., J. Polym. Sci. 1,429 (1946), and hereinafter, also referred to an "osmium tetroxide decomposition method"), the content of the vinyl aromatic compound polymer block in the component (B) is defined by the following expression:

content of the vinyl aromatic compound polymer block(% by mass)=(mass of vinyl aromatic compound polymer block in copolymer before hydrogenation/mass of copolymer before hydrogenation)×100

In the case where a plurality of polymer blocks exists in the component (B), the molecular weights of the blocks may be the same or different from each other, and the structures of the compositions may be the same or different from each other. For example, the hydrogenated copolymer block including the conjugated diene monomer unit and the vinyl aromatic monomer unit and the hydrogenated copolymer block mainly including the conjugated diene monomer unit may exist in the component (B). The boundary between the blocks and the end of the block may not always need to be clearly distinguished. The form of distribution of the vinyl aromatic monomer unit in the respective polymer blocks is not particularly limited. The vinyl aromatic monomer unit may be uniformly distributed, or distributed in a tapered manner, in a step manner, in a projected manner, or in a depressed manner. Moreover, a crystal portion may exist in the polymer block.

In the respective polymer block, the form of distribution of the vinyl unit in the conjugated diene monomer unit is not particularly limited. For example, its distribution may be lopsided. Examples of a method for controlling distribution of the vinyl unit may include a method of adding a vinylating agent during polymerization, and a method of changing a polymerization temperature. The conjugated diene monomer unit may have lopsided distribution of the hydrogenation rate. The distribution of the hydrogenation rate can be controlled by a method of changing distribution of the vinyl unit, or by a method of utilizing the difference in the hydrogenation rate between the isoprene unit and the butadiene unit when the copolymer which is obtained by copolymerizing isoprene and butadiene is hydrogenated using a hydrogenation catalyst described later.

From the viewpoint of heat resistance, aging resistance, and weatherability, in the component (B), preferably not less than 75 mol %, more preferably not less than 85 mol %, and still more preferably not less than 97 mol % of unsaturated bonds included in the conjugated diene monomer unit before hydrogenation is hydrogenated.

The hydrogenation catalyst used for hydrogenation is not particularly limited, and known catalysts can be used: (1) carrier-type heterogeneous hydrogenation catalysts in which a metal such as Ni, Pt, Pd, and Ru is carried on carbon, silica, alumina, diatomite, or the like, (2) the so-called Ziegler type hydrogenation catalysts using an transition metal salt (such as an organic acid salt or acetylacetone salt of Ni, Co, Fe, Cr, or the like) and a reducing agent (such as organic aluminum), and (3) homogeneous hydrogenation catalysts such as organic metal complexes of organic metal compounds of Ti, Ru, Rh, Zr, and the like. Specifically, as the hydrogenation catalyst, hydrogenation catalysts described in Japanese Patent Publication Nos. 42-008704, 43-006636, 63-004841, 01-037970, 01-053851, and 02-009041 can be used, for example. Among these, examples of preferable hydrogenation catalysts may include reducing organic metal compounds such as titanocene compounds.

As the titanocene compound, compounds described in Japanese Patent Laid-Open No. 08-109219 can be used, for example. Specific examples thereof may include compounds having at least one or more ligand having a (substituted) cyclopentadienyl skeleton, an indenyl skeleton, or a fluorenyl skeleton such as biscyclopentadienyltitanium dichloride and monopentamethylcyclopentadienyltitanium trichloride.

Examples of the reducing organic metal compound may include organic alkali metal compounds of organic lithium and the like, organic magnesium compounds, organic aluminum compounds, organic boron compounds, and organic zinc compounds.

In the present embodiment, a method for polymerizing the component (B) before hydrogenation is not particularly limited, and a known method can also be used. For example, examples thereof may include methods described in Japanese Patent Publication Nos. 36-019286, 43-017979, 46-032415, 49-036957, 48-002423, 48-004106, and 56-028925, and Japanese Patent Laid-Open Nos. 59-166518 and 60-186577.

When necessary, the component (B) may have a polar group. Examples of the polar group may include a hydroxyl group, a carboxyl group, a carbonyl group, a thiocarbonyl group, an acid halide group, an acid anhydride group, a thiocarboxylic acid group, an aldehyde group, a thioaldehyde group, a carboxylic acid ester group, an amide group, a sulfonic acid group, a sulfonic acid ester group, a phosphorus acid group, a phosphorus acid ester group, an amino group, an imino group, a nitrile group, a pyridyl group, a quinoline group, an epoxy group, a thioepoxy group, a sulfide group, an isocyanate group, an isothiocyanate group, a halogenated silicon group, an alkoxysilicon group, a halogenated tin group, a boronic acid group, a boron containing group, a boronic acid salt group, an alkoxytin group, and a phenyltin group.

In the copolymer before hydrogenation in the component (B), the content of the vinyl bond in the conjugated diene monomer unit is preferably not less than mol % from the viewpoint of flexibility and scratch resistance, and preferably not more than 70 mol % from the viewpoint of productivity, elongation at break, and scratch resistance. The content of the vinyl bond in the conjugated diene monomer unit is more preferably from 10 to 50 mol %, still more preferably from 10 to 30 mol %, and further still more preferably from 10 to 25 mol %.

Here, the content of the vinyl bond means the proportion of vinyl bonds integrated as 1,2-bond and 3,4-bond among vinyl bonds integrated as 1,2-bond, 3,4-bond, and 1,4-bond in the conjugated diene before hydrogenation. The content of the vinyl bond can be measured by NMR.

The weight average molecular weight of the component (B) before crosslinking is not particularly limited. From the viewpoint of scratch resistance, the weight average molecular weight is preferably not less than 50000. From the viewpoint of molding fluidity, the weight average molecular weight is preferably not more than 400000, and more preferably from 50000 to 300000. The molecular weight distribution (Mw/Mn: weight average molecular weight/number average molecular weight) is not particularly limited. From the viewpoint of scratch resistance, the molecular weight distribution is preferably a value close to 1. The weight average molecular weight and the number average molecular weight can be determined using tetrahydrofuran (1.0 mL/min) as a solvent on the condition of the oven temperature of 40° C. by gel permeation chromatography (GPC; made by SHIMADZU Corporation, apparatus name "LC-10"), column: TSKgelG-MHXL (4.6 mmID×30 cm, two columns). The weight average molecular weight (Mw), the number average molecular weight (Mn), and the molecular weight distribution (Mw/Mn) are calculated as a molecular weight in terms of polystyrene.

The content of the component (B) is from 80 to 200 parts by mass based on 100 parts by mass of the component (A). From the viewpoint of the balance between scratch resistance and flexibility, the content of the component (B) is preferably from 90 to 170 parts by mass based on 100 parts by mass of the component (A). At a content of the component (B) less than 80 parts by mass, the flexibility and scratch resistance are insufficient. At a content of the component (B) more than 200 parts by mass, the mechanical physical properties are inferior.

From the viewpoint of resistance to wear, preferably, the block mainly including a conjugated diene monomer unit in the component (B) is a copolymer block which mainly includes a conjugated diene monomer unit and which includes a vinyl aromatic monomer unit.

The copolymer block which mainly includes a conjugated diene monomer unit and which includes a vinyl aromatic monomer unit is not particularly limited, and the conjugated diene monomers and vinyl aromatic monomers above can be used. Among these, from the viewpoint of the balance between mechanical strength and impact resistance, examples of a preferable combination thereof may include a block including a butadiene unit and styrene unit and a block including an isoprene unit and a styrene unit.

The copolymer block mainly including a conjugated diene monomer unit and a vinyl aromatic monomer unit may be those mainly including at least a conjugated diene monomer unit, and the contents of the respective monomers are not particularly limited. Particularly, from the viewpoint of the balance between mechanical strength and impact resistance, the content of the vinyl aromatic monomer unit in the copolymer block is preferably not less than 10% by mass and less than 50% by mass, and more preferably not less than 20% by mass and less than 50% by mass.

Preferably, as the component (B), at least two or more hydrogenated products of a block copolymer are used in combination, being selected from hydrogenated products of a block copolymer in which the content of the vinyl aromatic monomer unit block (B-1) is not less than 20% by mass and less than 50% by mass, and hydrogenated products of a block copolymer in which the content of the vinyl aromatic monomer unit block (B-2) is not less than 50% by mass and not more than 80% by mass. The component (B-1) having a small content of the vinyl aromatic monomer unit contributes to the low temperature properties of thermoplastic elastomer composition, and the component (B-2) having a large content of the vinyl aromatic monomer unit contributes to stabilization of morphology of the matrix and the domain in the thermoplastic elastomer composition. The mass ratio (B-1/B-2) of the component (B-1) to the component (B-2) is preferably from 90/10 to 60/40 from the viewpoint of low temperature properties and mechanical physical properties.

Component (C)

The component (C) is a softening agent. The softening agent is not particularly limited. From the viewpoint of compatibility, hydrocarbon process oils such as paraffin-based hydrocarbon process oils, naphthene-based hydrocarbon process oils, and aromatic-based hydrocarbon process oils are preferable. Among these, from the viewpoint of weatherability and coloring properties, paraffin-based hydrocarbon process oils are preferable, and from the viewpoint of compatibility with rubber, naphthene-based hydrocarbon process oils are preferable. From the viewpoint of thermal stability and photostability, the content of the aromatic hydrocarbon in the process oil is preferably not more than 10%, more preferably not more than 5%, and still more preferably not more than 1% in a ratio of carbon atoms specified by ASTM D2140-97.

The content of the component (C) is from 100 to 250 parts by mass, and preferably from 150 to 200 parts by mass based on 100 parts by mass of the component (A). At a content less than 100 parts by mass, flexibility and processability are insufficient. At a content more than 250 parts by mass, bleed of the oil is remarkable and not preferable.

Component (D)

The component (D) is polyorganosiloxane. The structure of polyorganosiloxane is not particularly limited. From the viewpoint of resistance to wear and touch feeling, the structure of polyorganosiloxane is preferably a linear, branched, or crosslinking polymer structure.

The polyorganosiloxane used as the component (D) is not particularly limited, and known polyorganosiloxanes can also be used. Preferable polyorganosiloxanes are polymers including a siloxane unit having a substituent such as an alkyl group, a vinyl group, and an aryl group. Among these, particularly, polyorganosiloxane having an alkyl group is preferable, and polyorganosiloxane having a methyl group is more preferable.

Specific examples of the polyorganosiloxane having a methyl group may include polydimethylsiloxane, polymethylphenylsiloxane, and polymethylhydrogensiloxane. Among these, polydimethylsiloxane is preferable.

The kinematic viscosity of the component (D) is not particularly limited. From the viewpoint of resistance to wear, the kinematic viscosity (25° C.) specified in JIS Z8803 is preferably not less than 5000 centi stokes (cSt). The kinematic viscosity of the component (D) is preferably less than 100000 cSt because dispersibility of the component (D) in the thermoplastic elastomer composition according to the present embodiment tends to be improved, the appearance is good, and stability in quality during melt extrusion tends to be further improved. The kinematic viscosity of the component (D) is more preferably not less than 10000 cSt and less than 100000 cSt, and still more preferably not less than 50000 cSt and less than 100000 cSt.

The content of the component (D) is from 5 to 20 parts by mass, and preferably from 8 to 15 parts by mass based on 100 parts by mass of the component (A). If the content of the component (B) is less than 5 parts by mass, resistance to wear is insufficient. If the content of the component (B) is more than 20 parts by mass, bleed during molding is remarkable and not preferable.

Component (E)

Preferably, the thermoplastic elastomer composition according to the present embodiment further comprises an ethylene.α-olefin-based copolymer (E) including an ethylene unit and a unit of α-olefin having 3 to 20 carbon atoms. The ethylene.α-olefin-based copolymer can be obtained, for example, by copolymerizing ethylene with α-olefin having 3 to 20 carbon atoms.

Specific examples of α-olefin may include propylene, butene-1, pentene-1, hexene-1,4-methylpentene-1, heptene-1, octene-1, nonene-1, decene-1, undecene-1, and dodecene-1. Among these, from the viewpoint of economy, α-olefins having 3 to 12 carbon atoms are preferable, and particularly, propylene, butene-1, and octene-1 are more preferable.

When necessary, the ethylene.α-olefin-based copolymer (E) may further include a monomer unit having an unsaturated bond. The monomer is not particularly limited. From the viewpoint of economy, conjugated diolefins such as butadiene and isoprene; non-conjugated diolefins such as 1,4-hexadiene; cyclic diene compounds such as dicyclopentadiene and norbornene derivatives; and acetylenes are preferable. Among these, ethylidenenorbornene (ENB) and dicyclopentadiene (DCP) are more preferable.

The Mooney viscosity (ML) of the component (E) measured at 100° C. is not particularly limited. From the viewpoint of dispersibility in the thermoplastic elastomer composition according to the present embodiment, the Mooney viscosity is preferably 20 to 150, and more preferably 50 to 120. The Mooney viscosity (ML) of the component (E) is measured according to ASTM D1646.

The ethylene.α-olefin-based copolymer (E) is preferably produced using a metallocene-based catalyst. The metallocene-based catalyst is not particularly limited, and examples thereof may include those comprising a cyclopentadienyl derivative of metals of Group IV such as titanium and zirconium and a cocatalyst. The metallocene catalyst is a highly active polymerization catalyst. Additionally, compared to the Ziegler-type catalyst, the molecular weight distribution of the polymer to be obtained is narrower. Accordingly, the metallocene catalyst can provide more uniform distribution of the α-olefin monomer having 3 to 20 carbon atoms as a comonomer in the copolymer.

In the ethylene.α-olefin-based copolymer (E), the copolymerization ratio of the α-olefin is not particularly limited, and is preferably from 1 to 60% by mass, more preferably from 10 to 50% by mass, and still more preferably from 20 to 45% by mass. If the copolymerization ratio of the α-olefin is within the range, the mechanical strength such as tensile strength and flexibility of the molded product are further improved.

The density of the ethylene.α-olefin-based copolymer (E) is not particularly limited. The density is preferably from 0.80 to 0.90 g/cm$^3$, and more preferably from 0.85 to 0.89 g/cm$^3$. At a density of the component (E) within the range, the flexibility of the molded product is further improved.

The ethylene.α-olefin-based copolymer (E) preferably has a long-chain branch. Here, the long-chain branch means those having 3 or more carbon atoms. If the component (E) has a long-chain branch, a molded product having high strength and a low density can be obtained. The ethylene.α-olefin-based copolymer having a long-chain branch is not particularly limited. Known ethylene.α-olefin-based copolymers can also be used, for example, those described in U.S. Pat. No. 5,278,272 and the like.

Preferably, the ethylene.α-olefin-based copolymer (E) has a melting point peak measured by differential scanning calorimetry (DSC) in the range of the temperature not less than room temperature. If the component (E) has the melting point peak in the range of the temperature not less than room temperature, a molded product having high form stability and handling properties in the range of the temperature not more than the melting point and less stickiness can be obtained.

The MFR of the ethylene.α-olefin-based copolymer (E) (190° C., load of 2.16 kg; according to ASTM D1238) is not particularly limited. The MFR is preferably from 0.01 to 100 g/10 min, and more preferably from 0.2 to 10 g/10 min. At an MFR within the range above, a molded product having a good balance between molding fluidity and mechanical strength can be obtained.

The content of the ethylene.α-olefin-based copolymer (E) is preferably from 40 to 80 parts by mass, more preferably from 50 to 70 parts by mass based on 100 parts by mass of the component (A) from the viewpoint of the balance between molding fluidity and flexibility.

Component (F)

When necessary, the thermoplastic elastomer composition according to the present embodiment preferably has an organic peroxide (F). The organic peroxide (F) acts as a crosslinking initiator to the component (B) and the component (E) in the crosslinking, and can promote the decomposition reaction of the component (A). As a result, the fluidity and moldability of the thermoplastic elastomer composition can be further improved. For this reason, even if a part having a large surface area and a complicated shape is produced, followability to the metal mold or the like is high, and the composition can be more completely filled without voids into the metal mold.

Specific examples of the organic peroxide (F) may include peroxyketals such as 1,1-bis(t-butyl peroxy)-3,3,5-trimethyl cyclohexane, 1,1-bis(t-hexyl peroxy)-3,3,5-trimethyl cyclohexane, 1,1-bis(t-hexyl peroxy)cyclohexane, 1,1-bis(t-butyl peroxy)cyclododecane, 1,1-bis(t-butyl peroxy)cyclohexane, 2,2-bis(t-butyl peroxy)octane, n-butyl-4,4-bis(t-butyl peroxy)butane, n-butyl-4,4-bis(t-butyl peroxy)valerate; dialkyl peroxides such as di-t-butyl peroxide, dicumyl peroxide, t-butyl cumyl peroxide, α,α'-bis(t-butyl peroxy-m-isopropyl) benzene, α,α'-bis(t-butyl peroxy)diisopropyl benzene, 2,5-dimethyl-2,5-bis(t-butyl peroxy)hexane, 2,5-dimethyl-2,5-bis(t-butyl peroxy)hexyne-3; diacyl peroxides such as acetyl peroxide, isobutyryl peroxide, octanoyl peroxide, decanoyl peroxide, lauroyl peroxide, 3,5,5-trimethyl hexanoyl peroxide, benzoyl peroxide, 2,4-dichlorobenzoyl peroxide, m-thorioyl peroxide; peroxyesters such as t-butyl peroxy acetate, t-butyl peroxy isobutyrate, t-butyl peroxy-2-ethyl hexanoate, t-butyl peroxylaurate, t-butyl peroxy benzoate, di-t-butyl peroxy isophthalate, 2,5-dimethyl-2,5-di(benzoyl peroxy)hexane, t-butyl peroxy maleic acid, t-butyl peroxy isopropyl carbonate, cumyl peroxyoctate; and hydroperoxides such as t-butyl hydroperoxide, cumene hydroperoxide, diisopropyl benzene hydroperoxide, 2,5-dimethyl hexane-2,5-dihydroperoxide, 1,1,3,3-tetramethyl butyl peroxide.

Among these compounds, from the viewpoint of the pyrolysis temperature and the crosslinking ability, 1,1-bis(t-butyl peroxy)-3,3,5-trimethyl cyclohexane, di-t-butyl peroxide, dicumyl peroxide, 2,5-dimethyl-2,5-bis(t-butyl peroxy) hexane, 2,5-dimethyl-2,5-bis(t-butyl peroxy)hexyne-3 are preferable.

The content of the organic peroxide (F) is preferably from 2 to 6 parts by mass, and more preferably from 2 to 4 parts by mass based on 100 parts by mass of the component (A) from the viewpoint of molding fluidity.

When necessary, preferably, the component (F) further contains a monofunctional monomer or a polyfunctional monomer. These can function as a crosslinking aid, and control the crosslinking reaction rate.

As the monofunctional monomer, for example, radically polymerizable vinyl-based monomers are preferable. Examples thereof may include aromatic vinyl monomers, unsaturated nitrile monomers such as acrylonitrile and methacrylonitrile, acrylic acid ester monomers, methacrylic acid ester monomers, acrylic acid monomers, methacrylic acid monomers, maleic anhydride monomers, and N-substituted maleimide monomers.

Specific examples of the monofunctional monomer may include styrene, methylstyrene, chloromethylstyrene, hydroxystyrene, tert-butoxystyrene, acetoxystyrene, chlorostyrene, acrylonitrile, methacrylonitrile, methyl acrylate, ethyl acrylate, n-butyl acrylate, isobutyl acrylate, methyl methacrylate, ethyl methacrylate, n-butyl methacrylate, isobutyl methacrylate, 2-ethylhexyl methacrylate, maleic anhydride, methylmaleic anhydride, 1,2-dimethylmaleic anhydride, ethylmaleic anhydride, phenylmaleic anhydride, N-methylmaleimide, N-ethylmaleimide, N-cyclohexylmaleimide, N-laurylmaleimide, and N-acetylmaleimide. Among these, styrene, acrylonitrile, methacrylonitrile, methyl acrylate, maleic anhydride, N-methylmaleimide, and the like are preferable from the viewpoint of easiness of the reaction and general versatility. These monofunctional monomers may be used singly or in combinations of two or more.

The polyfunctional monomer is a monomer having a plurality of radically polymerizable functional groups as the functional group. Monomers having a vinyl group are preferable. The number of the functional group in the polyfunctional monomer is preferably 2 or 3.

As specific examples of the polyfunctional monomer, divinylbenzenze, triallyl isocyanurate, triallyl cyanurate, diacetone diacrylamide, polyethylene glycol diacrylate, polyethylene glycol dimethacrylate, trimethylolpropane trimethacrylate, trimethylolpropane triacrylate, ethylene glycol dimethacrylate, triethylene glycol dimethacrylate, diethylene glycol dimethacrylate, diisopropenyl benzene, p-quinone dioxime, p,p'-dibenzoyl quinone dioxime, phenyl maleimide, allyl methacrylate, N,N'-m-phenylene bismaleimide, diallyl phthalate, tetraallyl oxyethane, 1,2-polybutadiene and the like are preferable, and divinylbenzene and triallylisocyanurate are more preferable. These polyfunctional monomers may be used singly or in combinations of two or more.

The thermoplastic elastomer composition according to the present embodiment can further contain an inorganic filler, a plasticizer, and other additives within the range of the effect.

Examples of the inorganic filler may include calcium carbonate, magnesium carbonate, silica, carbon black, glass fiber, titanium oxide, clay, mica, talc, magnesium hydroxide, and aluminum hydroxide.

Examples of the plasticizer may include polyethylene glycol, and phthalic acid ester such as dioctyl phthalate (DOP).

Examples of the other additives may include organic and inorganic pigments such as carbon black, titanium dioxide, and phthalocyanine black; heat stabilizers such as 2,6-di-t-butyl-4-methylphenol and n-octadecyl-3-(3,5'-di-t-butyl-4-hydroxyphenyl)propionate; antioxidants such as tris nonylphenyl phosphite and distearyl pentaerythritol diphosphate; ultraviolet absorbing agents such as 2-(2'-hydroxy-5'-methylphenyl)benzotriazole and 2,4-dihydroxybenzophenone; light stabilizers such as bis-[2,2,6,6-tetramethyl-4-piperidinyl]sebacate, tetrakis(2,2,6,6-tetramethyl-4-piperidinyl)-1,2,3,4-butanetetracarboxylate; flame retardants such as ammonium polyphosphate, trioctyl phosphate, and magnesium hydroxide; silicone oils such as dimethylsilicone oil and methylphenylsilicone oil; anti-blocking agents such as stearamide and erucamide; foaming agents such as sodium bicarbonate and N,N'-dinitrosopentamethylenetetramine; antistatic agents such as palmitic acid monoglyceridegyceride and stearic acid monoglyceride; and antibacterial agents such as silver ion carrying zeolite and thiosulfate silver complexes.

The thermoplastic elastomer composition according to the present embodiment is obtainable by crosslinking the composition comprising each of the components described above, and satisfies the conditions (1) to (5) below:

(1) the content of the vinyl aromatic monomer unit in the component (B) is from 30 to 80% by mass,
(2) an MFR (ASTM D1238, 230° C., load of 1.2 kg) is from 35 to 85 g/10 min,
(3) a JIS A hardness is from 60 to 90,
(4) a compression set (JIS K6262, 100° C., 22 hours) is from 30 to 70%, and
(5) a tensile elongation at −30° C. is not less than 80%. The condition (1) has been described already. The conditions (2) to (5) will be described in detail below.

In the present embodiment, the crosslinking method is not particularly limited, and a known method can be used. Moreover, at least part of the composition may be crosslinked (partially crosslinked). In the crosslinking, the composition is preferably crosslinked particularly using the organic peroxide (F) described above. The condition on the crosslinking reaction is not particularly limited, and a suitable condition can be properly used according to desired physical properties for the thermoplastic elastomer composition according to the present embodiment.

In the thermoplastic elastomer composition according to the present embodiment, the MFR at 230° C. and a load of 1.2 kg is from 35 to 85 g/10 min, and preferably from 40 to 70 g/10 min. Moreover, the MFR at 230° C. and a load of 2.16 kg is preferably from 130 to 300 g/10 min. If the lower limit value of the MFR of the thermoplastic elastomer composition is the value above, higher molding fluidity can be obtained. If the upper limit value of the MFR is the value above, the molded product can obtain higher mechanical strength. Here, the MFR can be measured according to ASTM D1238.

The thermoplastic elastomer composition according to the present embodiment has a JIS A hardness (surface hardness) of from 60 to 90, and preferably from 65 to 85. Here, the JIS A hardness can be measured by the method described later in Examples.

The thermoplastic elastomer composition according to the present embodiment has a compression set (JIS K6262, 100° C., 22 hours) of 30 to 70%. If the thermoplastic elastomer composition has a compression set in this range, rubber properties and a suitable feeling can be given.

In the thermoplastic elastomer composition according to the present embodiment, the tensile elongation at −30° C. is not less than 80%, preferably from 100 to 300%, and more preferably from 150 to 250%. Here, the tensile elongation at −30° C. can be measured by the method described later in Examples.

The thermoplastic elastomer composition that satisfying the conditions above can provide a more uniform thickness of a molded product while rubber properties are kept. Moreover, the crimp reproductivity and the appearance and feeling of the molded product can be further improved, and elongation properties at a low temperature can be improved.

From the viewpoint of the molding fluidity and the mechanical strength of the molded product, the thermoplastic elastomer composition according to the present embodiment preferably further satisfies the conditions (i) and (ii) below:
(i) the melt viscosity at a shear rate of 100/sec measured by a capillary rheometer is from 30 to 200 Pa·sec, and
(ii) the melt viscosity at a shear rate of 1000/sec measured by a capillary rheometer is from 10 to 40 Pa·sec.

In the condition (i), the melt viscosity at a shear rate of 100/sec measured by a capillary rheometer is more preferably from 30 to 130 Pa·sec.

In the conditions (i) and (ii), if the lower limit value of the melt viscosity in the thermoplastic elastomer composition is the value above, higher molding fluidity can be obtained. In the conditions (i) and (ii), if the upper limit value of the melt viscosity is the value above, higher mechanical strength of the molded product can be obtained.

In the conditions (i) and (ii), the melt viscosity can be measured using a capillary rheometer "Capilograph 1D" made by Toyo Seiki Seisaku-sho, Ltd. on the condition of a heating temperature of 230° C., a cylinder diameter of 9.55 mm, an orifice diameter of 1.0 mmϕ, and an orifice length of 10 mm.

In the thermoplastic elastomer composition according to the present embodiment, at least one tan δ (loss tangent) peak temperature measured by dynamic viscoelastic analysis preferably exists in the range of −25 to 40° C. If at least one peak exists in the range of a temperature not less than −25° C., resistance to wear can be further improved. If at least one peak exists in the rage of a temperature not more than 40° C., the balance between hardness and flexibility can be further improved. The tan δ can be determined by measuring a viscoelastic spectrum using a rheospectoler (made by Rheology Co., Ltd., Type DVE-V4) on the condition of a strain of 0.1% and a frequency of 1 Hz.

In production of the thermoplastic elastomer composition according to the present embodiment, a standard method such as a Banbury mixer, a kneader, a single screw extruder, and a twin screw extruder usually used in production of the elastomer composition can be used. Among these, a twin screw extruder is preferable from the viewpoint of efficiently attaining dynamic crosslinking of the thermoplastic elastomer. In the case where a twin screw extruder is used, for example, the component (A), the component (B), and when necessary the component (E), and the component (F) are added, and uniformly and finely dispersed. Then, other component is further added. Thereby, the composition can undergo the crosslinking reaction, and the thermoplastic elastomer composition can be continuously produced. Accordingly, this method is more suitable.

Moreover, the above-described thermoplastic elastomer composition is preferably produced by the following process step. Namely, the component (A), the component (B), and the component (E) used when necessary are sufficiently mixed, and placed into a hopper of an extruder. In this case, the organic peroxide may be added from the beginning in the extruder together with the component (A), the component (B), and the component (E) used when necessary, or part of the organic peroxide may be added in the course of the extruder. Further, part of the component (A), the component (B), and the component (E) used when necessary may be added in the course of the extruder. Alternatively, the component (C) may be added in the course of the extruder, or may be added from the beginning and in the course of the extruder. At this time, the organic peroxide and the component (C) can be pre-mixed, and added. The component (D) also can be added from the beginning and in the course of the extruder, or can be added only in the course of the extrude. A method for adding the component (D) may be a method in which, a masterbatch containing a high concentration of the component (D) using any thermoplastic resin or elastomer is added in advance.

When the components are molten by heating and kneaded within the extruder, the component (B) and the component (E) and the component (F) used when necessary undergo the crosslinking reaction. Simultaneously, the decomposition reaction of the component (A) is promoted by the component (F) to improve molding fluidity. Further, the component (C) and the like are added and melt kneaded to sufficiently undergo the crosslinking reaction, and be kneaded and dispersed. Then, the obtained product is extracted from the extruder. Thus, a pellet of the thermoplastic elastomer composition can be obtained.

Particularly, a preferable melt extrusion method is a method using a twin screw extruder having a length L in a die direction from a raw material adding portion and an L/D ratio of 5 to 100 (wherein D represents a diameter of a barrel). The twin screw extruder has a plurality of feed portions of a main feed portion and a side feed portion which are provided at a different distance from the tip portion, and a kneading portion between the feed portions and between the leading portion and the feed portion provided closer to the leading portion. The lengths of the kneading portions are preferably from 3 to 10 times the diameter of the barrel.

The twin screw extruder may be a twin screw unilateral rotary extruder or a twin screw bilateral rotary extruder. The screw engagement has a non-engagement type, a partial engagement type, and a complete engagement type, and any type may be used. In the case where a uniform resin is obtained at a low temperature by applying a low shear force, a partial engagement type bilateral rotary screw is preferable. In the case where slightly large kneading is needed, a complete engagement type unilateral rotary screw is preferable. From the viewpoint of further improving the mechanical strength of the molded product, more preferably, a kneading degree M when kneading is performed using the twin screw extruder satisfies the relationship expressed by the following expression:

$$10 \times 10^6 \leq M \leq 1000 \times 10^6$$

wherein the kneading degree $M=(\pi^2/2)(L/D)D^3(N/Q)$,
L: the length of the extruder (mm) in the die direction from the raw material adding portion,
D: the barrel inner diameter in the extruder (mm),
Q: the discharge amount (kg/h),
N: the number of rotation (rpm) of the screw.

At a kneading degree M of not less than $10 \times 10^6$, enlargement and aggregation of the rubber particle can be prevented to provide a good appearance. At an M of not more than $1000 \times 10^6$, reduction in mechanical strength caused by an excessive shear force can be prevented. Using the thus-obtained thermoplastic elastomer composition, a variety of molded products can be produced by any molding method. Injection molding, extrusion, compression molding, blow molding, calendering, foaming molding, and the like are preferably used.

The molded products according to the present embodiment can be obtained by molding the thermoplastic elastomer composition by various molding methods. For example, examples thereof may include an injection molding method, an extrusion method, a vacuum forming method, a pressure forming method, a blow molding method, a calendering method, and a foaming molding method. For example, the heated and molten thermoplastic elastomer composition is filled into a molding metal mold, cooled and solidified, and removed from the mold. Thereby, a molded product such as a surface material can be produced.

Preferably, the thermoplastic elastomer composition according to the present embodiment is an injection molded product. In the case where the thermoplastic elastomer composition according to the present embodiment is formed into the injection molded product, productivity is high. The shape of the injection molded product is not particularly limited. From the viewpoint of application as the surface material, preferably, the injection molded product has a shape of a sheet.

The injection molded product can be used for various members. Preferably, the injection molded product is used as an automobile interior material particularly because a thin molded product having a complicated shape can be injection molded at high reproductivity.

By use of the thermoplastic elastomer composition according to the present embodiment, even a thin member having a large surface area and a complicated shape can be produced at high productivity, while such a member was difficult to produce by the injection molding in the conventional art. For example, in the case where the thermoplastic elastomer composition according to the present embodiment is formed into an automobile interior material, an automobile interior material having an average thickness of not more than 2 mm and a surface area not less than 1000 $cm^2$ can be attained. Conventionally, an automobile interior material having such an average thickness and surface area was difficult to produce by the injection molding. By use of the thermoplastic elastomer composition according to the present embodiment, however, even such an automobile interior material can be produced at high productivity by the injection molding.

Further, among the automobile interior materials, an instrument panel is thin and has a large surface area, and in addition, usually has a complicated shape. For example, the instrument panel has a crimp pattern on the surface thereof, has an opening in part thereof, has not only a flat surface but also a curved surface, has a three-dimensional structure, or has not only a thin portion but also a thick portion. According to the present embodiment, a thin injection molded product having a large surface area can be formed. Accordingly, the automobile interior material according to the present invention is suitable of the instrument panel or the member thereof. Examples of a molded product used as such an instrument panel or the member thereof specifically may include molded products having an average thickness of not more than 2 mm and a surface area not less than 1000 $cm^2$. As described above, such a molded product was difficult to produce by the injection molding in the conventional art while such a molded product can be produced by the injection molding in the present embodiment.

The shape and configuration of the automobile interior material is not particularly limited, and a suitable configuration can be properly determined according to the application or the like. Preferable examples thereof may include a laminate comprising a layer including the automobile interior material according to the present embodiment (hereinafter, referred to as a "surface material layer" in some cases), and a layer including a core material laminated on the layer including the automobile interior material (hereinafter, referred to as a "core material layer" in some cases). By forming a laminate including not only the surface material layer but also the core material layer, even a product having a three-dimensionally complicated shape can be mass produced stably, attaining improvement in production efficiency and reduction in cost.

The material for core material is not particularly limited, and known materials can be used. Examples thereof may include polypropylene, acrylonitrile.butadiene.styrene (ABS) resin, polycarbonate/acrylonitrile.butadiene.styrene alloy (PC/ABS alloy), acrylonitrile.styrene copolymer, modified polyphenylene oxide, and resin whose strength is improved by mixing a filler such as talc and glass fiber when necessary. Among these, those containing at least one selected from the group consisting of polypropylene, acrylonitrile.butadiene.styrene (ABS) resin, and polycarbonate/acrylonitrile.butadiene.styrene alloy (PC/ABS alloy), and polyphenylene ether are preferable. Further, from the viewpoint of light weightiness, polypropylenes are more preferable.

The layer structure of the laminate according to the present embodiment is not particularly limited. The layer structure may have a two- or more layer structure comprising at least the surface material layer and the core material layer. In the present embodiment, the surface material layer does not always need to contact the core material layer, and other layer may exist between the surface material layer and the core material layer.

The thickness of the surface material layer is not particularly limited, and is preferably from 0.5 to 2.0 mm, and more preferably from 0.8 to 1.5 mm. At a thickness of the surface material layer of not less than 0.5 mm, a better appearance, and higher resistance against chemicals and resistance to wear can be provided. At a thickness of not more than 2.0 mm, economy can be improved and a better feeling can be obtained. Such a thin surface material layer was difficult to efficiently produce by the techniques in the conventional art. By use of the thermoplastic elastomer composition according to the present embodiment, such a thin surface material layer can also be produced simply.

The thickness of the core material layer is not particularly limited, and is preferably from 2.0 to 4.5 mm, and more preferably from 2.5 to 3.5 mm. At a thickness of the core material layer of not less than 2.0 mm, higher rigidity, heat resistance, and moldability can be provided. At a thickness of not more than 4.5 mm, economy and light weightiness can be improved.

Further, the laminate according to the present embodiment preferably further comprises a layer including a foaming material between the surface material layer and the core material layer. More preferably, the foaming material contains a thermosetting urethane foam having a density of 100 to 250 $kg/m^3$. At a density of the foaming material of not less than 100 $kg/m^3$, impressions during production or handling such as removal are difficult to occur, and higher handling properties can be provided. At a density of the foaming material of not more than 250 $kg/m^3$, flexibility can be properly given to the laminate. From such as viewpoint, the density of the foaming material is still more preferably 120 to 180 $kg/m^3$.

The kind of the thermosetting urethane foam is not particularly limited. Semi-hard thermosetting urethane foams are preferable. The semi-hard thermosetting urethane foam refers to a urethane foam having an open-cell structure in a proportion of not less than 90%.

A method for producing a laminate is not particularly limited, and a known method can be used. Examples thereof may include:

a method comprising the step of molding the surface material, the core material and the forming material individually, and the step of laminating these members using a chloroprene adhesive or the like to form a layer structure; and a method comprising the step of molding the core material in advance, the step of integrally molding the core material and the surface material within a metal mold (integral molding), and the step of laminating the core material and these two other members (the surface material and the foaming material) to form a layer structure.

By the layer structure described above, a laminate can be obtained, the laminate which includes a surface material having a uniform thickness, which can achieve high crimp reproductivity, a good feeling, and a good feeling appearance, and which enable stable mass production even if the laminate has a three-dimensionally complicated shape. Further, by a layer structure having three or more layers and including the foaming material, a laminate having a soft feeling of the surface material can be obtained.

Among the automobile interior materials, the laminate above can be suitably used as a thin member having a large surface area such as instrument panels, door panels, glove box lids and the like, which have been difficult to produce by the injection molding in the conventional art. Particularly, the laminate is suitable for the instrument panel.

Figure 2:
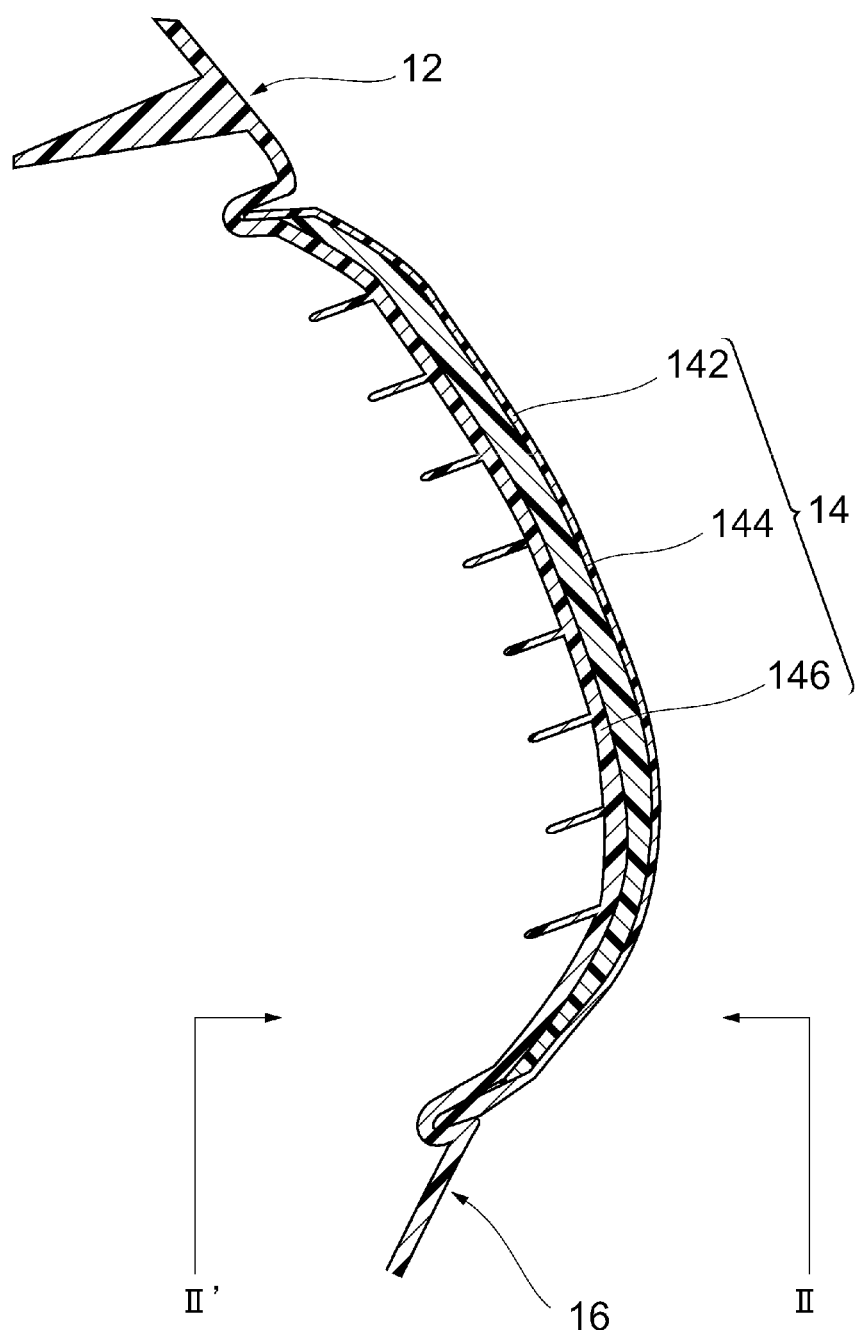
FIG. 2 shows an enlarged sectional view of a portion in the vicinity of a pad portion in the instrument panel shown in FIG. 1 and taken along a line II-II'.

Specific examples of the instrument panel according to the present embodiment will be described. FIG. 1 shows a perspective view of one embodiment of the instrument panel according to the present embodiment. FIG. 2 shows an enlarged sectional view of a portion in the vicinity of a pad portion in the instrument panel shown in FIG. 1 and taken along a line II-II'. An instrument panel 1 includes an upper portion 12, a pad portion 14, and a lower portion 16. The pad portion 14 is a laminate having a three-layer laminated structure formed sequentially from the surface side within the cabin of the automobile (the side seen by a user of the automobile, the side from right to left in FIG. 2) with an automobile surface material layer (surface material layer) 142, a foaming material layer 144 laminated on the rear side of the automobile surface material layer 142 (the side not seen by the user of the automobile, the side from left to right in FIG. 2), and a core material layer 146 provided on the rear side of the foaming material layer 144.

According to the instrument panel according to the present embodiment, the effect described in the embodiments of the automobile surface material and the laminate is obtained. Further, the surface material has good elongation properties at a low temperature. For this reason, an air bag for a passenger seat can surely obtain a developing ability at a low temperature more easily. Moreover, freedom of design can be kept or improved, for example, a surface material can have a seamless portion in which the air bag is disposed.

Examples

Hereinafter, the present invention will be described more in detail using Examples and Comparative Examples, but the present invention will not be limited to these Examples. In Examples, numeric values are represented in terms of mass unless otherwise specified.

The components in the raw materials used in Examples and Comparative Examples were tested using the following test methods.

(1) Hydrogenation Rate (%)

The hydrogenation rate was measured by nuclear magnetic resonance spectrometry (NMR). A nuclear magnetic resonance spectrometer (made by JEOL, apparatus name "JNM-LA400") was used as a measurement apparatus. Deuterochloroform was used as a solvent. Tetramethylsilane (TMS) was used as a chemical shift reference. Measurement was performed on the condition of a concentration of a sample of 50 mg/mL, an observation frequency of 400 MHz, a pulse delay of 2.904 seconds, the number of times of scan of 64, a pulse width of 45°, and the measurement temperature of 26° C.

(2) Content of Monomer Unit and Content of Bond Unit

Using NMR, the respective contents of the units was measured in the vinyl aromatic monomer unit, the ethylene monomer unit, the butylene monomer unit, the 1,4-bond unit in butadiene, the 1,2-bond unit in butadiene, and the 3,4-bond unit in butadiene. A nuclear magnetic resonance spectrometer (made by JEOL, apparatus name "JNM-LA400") was used as a measurement apparatus. Deuterochloroform was used as a solvent. Tetramethylsilane (TMS) was used as a chemical shift reference. Measurement was performed on the condition of a concentration of a sample of 50 mg/mL, an observation frequency of 400 MHz, a pulse delay of 2.904 seconds, the number of times of scan of 64, a pulse width of 45°, and the measurement temperature of 26° C.

(3) Content of Styrene Polymer Block (Os Value)

The content of the styrene polymer block was measured using the copolymer before hydrogenation according to the method described in I. M. Kolthoff, et al., J. Polym. Sci. 1,429 (1946) (osmium tetroxide decomposition method). The copolymer before hydrogenation was decomposed using a 0.1 g/125 mL ternary butanol solution of osmic acid. The content of the styrene polymer block was calculated using the following expression. The content of the styrene polymer block obtained here is referred to as an "Os value."

content of styrene polymer block (Os value; % by mass)=(mass of styrene polymer block in copolymer before hydrogenation)/mass of copolymer before hydrogenation)×100

In Examples and Comparative Examples, the following components were used.

(A) Homopolypropylene (PP)

Homopolymer type polypropylene made by SunAllomer Ltd., (melt flow rate (MFR) on the condition of 230° C. and a load of 2.16 kg: 0.5 g/10 min; weight average molecular weight of $6.6 \times 10^5$) (hereinafter, referred to as "PP")

(B) Method for Producing Hydrogenated Product of Block Copolymer (1) Preparation of Hydrogenation Catalyst A hydrogenation catalyst used in the hydrogenation reaction of the block copolymer (B) was prepared by the following method.

An inside of a reaction container was replaced with nitrogen. 1 L of dried and refined cyclohexane was placed in the reaction container, and 100 mmol of bis(cyclopentadienyl) titanium dichloride was added. While the obtained solution was sufficiently stirred, an n-hexane solution containing 200 mmol of trimethylaluminum was added to make a reaction at room temperature for approximately 3 days.

(2) Production of Hydrogenated Product (Rubber-1) of Block Copolymer (B-1) Batch polymerization was performed using a tank reactor having a jacket and a stirrer having an inner volume of 10 L. First, 6.4 L of dried and refined cyclohexane and 175 g of styrene were added. Tetramethylethylenediamine (TMEDA) was added in advance such that the molar number of TMEDA was 0.30 times mol the molar number of Li in n-butyllithium initiator, and the molar number of Li in the n-butyllithium initiator was 11 mmol. The polymerization was performed at an initial temperature of 65° C. After the polymerization was completed, a cyclohexane solution containing 650 g of butadiene (concentration of the monomer of 22% by mass) was continuously fed to the reactor at a constant rate over 60 minutes. Then, a cyclohexane solution containing 175 g of styrene (concentration of the monomer of 22% by mass) was further added over 10 minutes to obtain a copolymer. In the obtained copolymer, the content of the styrene polymer block was 35% by mass, and the content of the vinyl bond was 36%.

To the obtained copolymer, the hydrogenation catalyst was added at 100 ppm in terms of titanium based on 100 parts by mass of the copolymer. A hydrogenation reaction was performed at a pressure of hydrogen of 0.7 MPa and a temperature of 75° C. to obtain a reaction solution. 0.3 parts by mass of octadecyl-3-(3,5-di-t-butyl-4-hydroxyphenyl)propionate as a stabilizer was added to the obtained reaction solution based on 100 parts by mass of the hydrogenated copolymer. The obtained hydrogenated copolymer had a weight average molecular weight of 150000. The hydrogenation rate of the double bonds in butadiene contained in the hydrogenated copolymer was 99% (hereinafter, the hydrogenated copolymer is referred to as "Rubber-1").

(3) Production of Hydrogenated Product (Rubber-2) of Block Copolymer (B-2)

Batch polymerization was performed using a tank reactor having a jacket and a stirrer having an inner volume of 10 L. First, 6.4 L of cyclohexane and 325 g of styrene were added. TMEDA was added in advance such that the molar number of TMEDA was 0.40 times mol the molar number of Li in n-butyllithium and the molar number of Li in the n-butyllithium initiator was 20 mmol. The polymerization was performed at an initial temperature of 65° C. After the polymerization was completed, a cyclohexane solution containing 350 g of butadiene (concentration of the monomer of 22% by mass) was continuously fed to the reactor at a constant rate over 60 minutes. After the polymerization was completed, a cyclohexane solution containing 325 g of styrene (concentration of the monomer of 22% by mass) was further added over 10 minutes to obtain a copolymer. In the obtained copolymer, the content of the styrene polymer block was 65% by mass, and the content of the vinyl bond was 40%.

To the obtained copolymer, the hydrogenation catalyst was added at 100 ppm in terms of titanium based on 100 parts by mass of the polymer. A hydrogenation reaction was performed at a pressure of hydrogen of 0.7 MPa and a temperature of 75° C. 0.3 parts by mass of octadecyl-3-(3,5-di-t-butyl-4-hydroxyphenyl)propionate as a stabilizer was added to the obtained polymer solution based on 100 parts by mass of the hydrogenated product of the block copolymer. The obtained hydrogenated copolymer had a weight average molecular weight of 50000. The hydrogenation rate of the double bonds in butadiene contained in the hydrogenated copolymer was 99% (hereinafter, the hydrogenated copolymer is referred to "Rubber-2").

(4) Production of Hydrogenated Product (Rubber-3) of Block Copolymer (B-3)

Batch polymerization was performed using a tank reactor having a jacket and a stirrer having an inner volume of 10 L. First, 6.4 L of cyclohexane and 75 g of styrene were added. TMEDA was added in advance such that the molar number of TMEDA was 0.25 times mol the molar number of Li in n-butyllithium, and the molar number of Li in the n-butyllithium initiator was 10 mmol. The polymerization was performed at an initial temperature of 65° C. After the polymerization was completed, a cyclohexane solution containing 470 g of butadiene and 380 g of styrene (concentration of the monomer of 22% by mass) was continuously fed to the reactor at a constant rate over 60 minutes. After the polymerization was completed, a cyclohexane solution containing 75 g of styrene (concentration of the monomer of 22% by mass) was further added over 10 minutes to obtain a copolymer. The content of styrene in the obtained copolymer was 53% by mass. The content of the styrene polymer block in the copolymer was 15% by mass. The content of styrene in the copolymer block (namely, the copolymer block including the conjugated diene monomer unit and the vinyl aromatic monomer unit) was 45% by mass, and the content of the vinyl bond was 23%.

To the obtained copolymer, the hydrogenation catalyst was added at 100 ppm in terms of titanium based on 100 parts by mass of the polymer. A hydrogenation reaction was performed at a pressure of hydrogen of 0.7 MPa and a temperature of 75° C. 0.3 parts by mass of octadecyl-3-(3,5-di-t-butyl-4-hydroxyphenyl)propionate as a stabilizer was added to the obtained polymer solution based on 100 parts by mass of the hydrogenated copolymer. The obtained hydrogenated copolymer had a weight average molecular weight of 160000. The hydrogenation rate of the double bonds in butadiene contained in the hydrogenated copolymer was 99% (hereinafter, the hydrogenated copolymer is referred to as "Rubber-3").

(5) Production of Hydrogenated Product (Rubber-4) of Block Copolymer (B-4)

Batch polymerization was performed using a tank reactor having a jacket and a stirrer having an inner volume of 10 L. First, 6.4 L of dried and refined cyclohexane and 210 g of styrene were added. Tetramethylethylenediamine (TMEDA) was added in advance such that the molar number of TMEDA was 2.0 times mol the molar number of Li in the n-butyllithium initiator and the molar number of Li in the n-butyllithium initiator was 0.008 mol. The polymerization was performed at an initial temperature of 55° C. After the polymerization was completed, a cyclohexane solution containing 580 g of butadiene (concentration of the monomer of 22% by mass) was continuously fed to the reactor at a constant rate over 60 minutes. Then, a cyclohexane solution containing 210 g of styrene (concentration of the monomer of 22% by mass) was further added over 10 minutes to obtain a copolymer. In the obtained copolymer, the content of the styrene polymer block was 42% by mass, and the content of the vinyl bond was 75%.

To the obtained copolymer, the hydrogenation catalyst was added at 100 ppm in terms of titanium based on 100 parts by mass of the polymer. A hydrogenation reaction was performed at a pressure of hydrogen of 0.7 MPa and a temperature of 75° C. 0.3 parts by mass of octadecyl-3-(3,5-di-t-butyl-4-hydroxyphenyl)propionate as a stabilizer was added to the obtained polymer solution based on 100 parts by mass of the hydrogenated copolymer. The obtained hydrogenated copolymer had a weight average molecular weight of 96000. The hydrogenation rate of the double bonds in butadiene contained in the hydrogenated copolymer was 99% (hereinafter, the hydrogenated copolymer is referred to as "Rubber-4").

(6) Production of Hydrogenated Product (Rubber-5) of block copolymer (B-5)

Batch polymerization was performed using a tank reactor having a jacket and a stirrer having an inner volume of 10 L. Tetramethylethylenediamine was added in advance such that the molar number of tetramethylethylenediamine was 0.3 times mol the molar number of Li in n-butyllithium. Thereby, a n-butyllithium initiator was prepared. 6.4 L of cyclohexane and 60 g of styrene were added to the reactor. Then, the n-butyllithium initiator was added such that the molar number of Li in the n-butyllithium initiator was 0.008 mol, and the polymerization was performed at an initial temperature of 65°

C. After the polymerization was completed, a cyclohexane solution containing 600 g of butadiene and 280 g of styrene (concentration of the monomer of 22% by mass) was continuously fed to the reactor at a constant rate over 60 minutes. After the polymerization was completed, a cyclohexane solution containing 60 g of styrene (concentration of the monomer of 22% by mass) was further added over 10 minutes to obtain a copolymer. The content of styrene in the obtained copolymer was 40% by mass. The content of the styrene polymer block in the copolymer was 12% by mass. The content of styrene in the copolymer block (namely, the copolymer block including the conjugated diene monomer unit and the vinyl aromatic monomer unit) was 32% by mass, and the content of the vinyl bond was 20%.

To the obtained copolymer, the hydrogenation catalyst was added at 100 ppm in terms of titanium based on 100 parts by mass of the copolymer. A hydrogenation reaction was performed at a pressure of hydrogen of 0.7 MPa and a temperature of 75° C. to obtain a polymer solution. 0.3 parts by mass of octadecyl-3-(3,5-di-t-butyl-4-hydroxyphenyl)propionate as a stabilizer was added to the obtained reaction solution based on 100 parts by mass of the hydrogenated copolymer. The obtained hydrogenated copolymer had a weight average molecular weight of 152000. The hydrogenation rate of the double bonds in butadiene contained in the hydrogenated copolymer was 99% (hereinafter, the hydrogenated copolymer is referred to as "Rubber-5").

(7) Production of Hydrogenated Product (Rubber-6) of Block Copolymer (B-6)

Batch polymerization was performed using a tank reactor having a jacket and a stirrer having an inner volume of 10 L. Tetramethylethylenediamine was added in advance such that the molar number of tetramethylethylenediamine was 0.3 times mol the molar number of Li in n-butyllithium. Thereby, a n-butyllithium initiator was prepared. 6.4 L of cyclohexane and 80 g of styrene were added to the reactor. Then, the n-butyllithium initiator was added such that the molar number of Li in the n-butyllithium initiator was 0.008 mol, and the polymerization was performed at an initial temperature of 65° C. After the polymerization was completed, a cyclohexane solution containing 280 g of butadiene and 560 g of styrene (concentration of the monomer of 22% by mass) was continuously fed to the reactor at a constant rate over 60 minutes. After the polymerization was completed, a cyclohexane solution containing 80 g of styrene (concentration of the monomer of 22% by mass) was further added over 10 minutes to obtain a copolymer. The content of styrene in the obtained copolymer was 72% by mass. The content of the styrene polymer block in the copolymer was 16% by mass. The content of styrene in the copolymer block (namely, the copolymer block including the conjugated diene monomer unit and the vinyl aromatic monomer unit) was 67% by mass, and the content of the vinyl bond was 15%.

To the obtained copolymer, the hydrogenation catalyst was added at 100 ppm in terms of titanium based on 100 parts by mass of the copolymer. A hydrogenation reaction was performed at a pressure of hydrogen of 0.7 MPa and a temperature of 75° C. to obtain a reaction solution. 0.3 parts by mass of octadecyl-3-(3,5-di-t-butyl-4-hydroxyphenyl)propionate as a stabilizer was added to the obtained reaction solution based on 100 parts by mass of the hydrogenated copolymer. The obtained hydrogenated copolymer had a weight average molecular weight of 149000. The hydrogenation rate of the double bonds in butadiene contained in the hydrogenated copolymer was 99% (hereinafter, the hydrogenated copolymer is referred to as "Rubber-6").

(8) Production of Hydrogenated Product (Rubber-7) of Block Copolymer (B-7)

Batch polymerization was performed using a tank reactor having a jacket and a stirrer having an inner volume of 10 L. Tetramethylethylenediamine was added in advance such that the molar number of tetramethylethylenediamine was 0.3 times mol the molar number of Li in n-butyllithium. Thereby, a n-butyllithium initiator was prepared. 6.4 L of cyclohexane and 135 g of styrene were added to the reactor. Then, the n-butyllithium initiator was added such that the molar number of Li in the n-butyllithium initiator was 0.008 mol, and the polymerization was performed at an initial temperature of 65° C. After the polymerization was completed, a cyclohexane solution containing 800 g of butadiene and 90 g of styrene (concentration of the monomer of 22% by mass) was continuously fed to the reactor at a constant rate over 60 minutes. After the polymerization was completed, a cyclohexane solution containing 135 g of styrene (concentration of the monomer of 22% by mass) was added over 10 minutes to obtain a copolymer. The content of styrene in the obtained copolymer was 31% by mass. The content of the styrene polymer block in the copolymer was 23% by mass. The content of styrene in the copolymer block (namely, the copolymer block including the conjugated diene monomer unit and the vinyl aromatic monomer unit) was 10% by mass, and the content of the vinyl bond was 40%.

To the obtained copolymer, the hydrogenation catalyst above was added at 100 ppm in terms of titanium based on 100 parts by mass of the copolymer. A hydrogenation reaction was performed at a pressure of hydrogen of 0.7 MPa and a temperature of 75° C. to obtain a polymer solution. 0.3 parts by mass of octadecyl-3-(3,5-di-t-butyl-4-hydroxyphenyl) propionate as a stabilizer was added to the obtained polymer solution based on 100 parts by mass of the hydrogenated copolymer. The obtained hydrogenated copolymer had a weight average molecular weight of 103000. The hydrogenation rate of the double bonds in butadiene contained in the hydrogenated copolymer was 99% (hereinafter, the hydrogenated copolymer "Rubber-7").

(C) Softening Agent

Paraffin-based oil (made by Idemitsu Kosan Co. Ltd., trade name "Diana Process Oil PW-90")

(D) Polyorganosiloxane

Dimethylsiloxane (made by Dow Corning Toray Co., Ltd., trade name "SH200"; 60000 centi stokes (cSt)) was used (hereinafter, referred to as "Polyorganosiloxane-1").

Dimethylsiloxane (made by Dow Corning Toray Co., Ltd., trade name "SH200"; 3000 centi stokes (cSt)) was used (hereinafter, referred to as "Polyorganosiloxane-2").

(E) Production of Ethylene.α-Olefin-Based Copolymer (Rubber-8, Rubber-9)

A copolymer of ethylene and octene-1 was produced by a method using the metallocene catalyst described in Japanese Patent Laid-Open No. 03-163088. The content of ethylene in the copolymer was 72% by mass, and the content of octene-1 was 28% by mass (hereinafter, referred to as "Rubber-8").

A copolymer of ethylene and octene-1 produced using a metallocene catalyst (made by Dow Chemical Company, trade name "ENGAGE 8842") was used. The content of ethylene in the copolymer was 55% by mass, and the content of octene was 45% by mass (hereinafter, referred to as "Rubber-9").

(F) Organic Peroxide 2,5-dimethyl-2,5-bis(t-butylperoxy)hexane (made by NOF Corporation, trade name "PERHEXA 25B")

The following polyfunctional monomers were used in combination as a crosslinking aid based on 100 parts by mass of 2,5-dimethyl-2,5-bis(t-butylperoxy)hexane:

Triallylisocyanurate (made by Nippon Kasei Chemical Company Limited; hereinafter, referred to as "TAIC") 1.4 parts by mass Divinylbenzene (made by Wako Pure Chemical Industries, Ltd.; hereinafter, referred to as "DVB") 0.4 parts by mass Examples and Comparative Examples As an extruder, a twin screw extruder having an oil inlet port in a central portion of a barrel (40 mmφ, L/D=47; made by TOSHIBA MACHINE CO., LTD., "TEM58SS") was used. As a screw, a double start screw having a kneading portion before and after an inlet port was used. The raw materials shown in the table other than the softening agent were mixed in batch in the composition ratio (parts by mass ratio) shown in the table. Then, the mixed raw material was introduced into a twin screw extruder (temperature of a cylinder of 200° C.) by a constant volume feeder. Subsequently, a predetermined amount of the softening agent was injected by a pump from the inlet port located in the central portion of the extruder. The obtained kneaded product was subjected to melt extrusion to obtain a thermoplastic elastomer composition. Using a heat press (made by Toho Press Seisakusho K.K., "T-50"), the obtained thermoplastic elastomer composition was compression molded at 200° C. to form the thermoplastic elastomer composition into a sheet having a thickness of 2 mm. The sheet was used as a sample for evaluation in evaluation of physical properties (2), (3), (4), and (7) below.

The physical properties of the thermoplastic elastomer composition and the sample were evaluated according to the following methods. In the thermoplastic elastomer composition in Example 1, the weight average molecular weight of the component (A) after crosslinking measured by GPC was $11 \times 10^4$ in terms of polystyrene. In Examples and Comparative Examples other than Example 1, the weight average molecular weights of the components (A) after crosslinking were shown in Tables 1 to 5, respectively.

(1) Melt Flow Rate (MFR)

Measurement was performed according to ASTM D1238. The measurement was performed on two measurement conditions, i.e., the case of a heating temperature of 230° C. and a load of 1.2 kg, and the case of a heating temperature of 230° C. and a load of 2.16 kg.

(2) Surface Hardness (JIS A Hardness)

The sample sheet having a thickness of 2 mm was used. Four of the sheets were layered, and evaluated according to Type A in JIS K7215 under an atmosphere of 23° C.

(3) Compression Set

The compression set was measured according to JIS K6262. The sample sheet having a thickness of 2 mm was punched to obtain a disk having a diameter of 2.9 mm. Six to seven of the disks were layered so as to have a thickness of 12.7 mm. This was used as a test piece. The test piece was mounted on a jig. A pressure was applied to the jig by a compressor to compress the test piece so as to have e thickness of 9.52 mm (compression proportion of 25%). A bolt of the jig was tightened to keep the compressed state. The jig having the test piece mounted thereon was placed in an oven at 100° C., and left as it was for 22 hours. After the heat treatment, the test piece was left in a thermostat chamber at 23° C. for 30 minutes and cooled, and the thickness t of the test piece (mm) was measured. The compression set (%) was calculated using the following expression:

$$\text{compression set (\%)} = \{(12.7-t)/3.18\} \times 100$$

(4) Low Temperature Properties

The tensile elongation (%) was evaluated according to JIS K6251 under an atmosphere of −30° C.

(5) Weight Average Molecular Weight of Component (A)

The polypropylene-based resin (A) in the thermoplastic elastomer composition was obtained as follows: approximately 1 g of a pellet was subjected to Soxhlet extraction using o-dichlorobenzene as a solvent for 10 hours, and the polypropylene-based resin (A) was dissolved and extracted. The obtained polypropylene-based resin component was measured by gel permeation chromatography (GPC) on the following condition, and the weight average molecular weight in terms of polystyrene was determined.

measurement apparatus: made by Waters Corporation, GPC/V2000 column: Shodex AT-G+AT806 MS×2 solvent: o-dichlorobenzene temperature: column and injector 145° C.

concentration: approximately 1.0 g/L flow rate: 1.0 mL/min detector: refractive index detector (RI)

(6) Loss Tangent (Tan δ Peak Temperature)

The loss tangent (tan δ peak temperature) was determined by measuring the viscoelastic spectrum using a rheospectoler (made by Rheology Co., Ltd., Type DVE-V4) on the condition of a strain of 0.1% and a frequency of 1 Hz.

(7) Mechanical Physical Properties (Tensile Strength and Tensile Elongation)

Tensile strength (MPa) and tensile elongation (%) were evaluated according to JIS K6251 under an atmosphere of 23° C.

(8) Melt Viscosity

Using a capillary rheometer "Capilograph 1D" made by Toyo Seiki Seisaku-sho, Ltd., the melt viscosity was measured at a heating temperature of 230° C., a cylinder diameter of 9.55 mm, an orifice diameter of 1.0 mmφ, and an orifice length of 10 mm. The melt viscosity was measured by the capillary rheometer at a shear rate of 100/sec and at a shear rate of 1000/sec, respectively.

(9) Injection Molding Properties

The thermoplastic elastomer composition was injection molded using a flat sheet metal mold having a thickness of 2 mm, a length of 32 cm, a width of 32 cm, a gate width of 8 mm, and a gate thickness of 2 mm, and having a cavity whose surface was leather textured. Thereby, the injection molding properties of the thermoplastic elastomer composition was evaluated. As the injection molding machine, an "SG220" made by Sumitomo Heavy Industries, Ltd. was used. In the molding condition, the temperature of the resin was 230° C., the temperature of the metal mold was 60° C., the injection time was 10 seconds, the injection rate was 80%, the back pressure was 10%, the number of rotation of the screw was 100 rpm, and the injection pressure was 100 MPa.

In the thermoplastic elastomer composition used in the injection molding, the flat sheet moldability was evaluated based on the determination criterion below:

"S": the thermoplastic elastomer composition was completely filled without voids into the metal mold, and the obtained molded product had no appearance deficit, "A": the thermoplastic elastomer composition was completely filled without voids into the metal mold, but the obtained molded product had slight weld or sink marks, "B": the thermoplastic elastomer composition was completely filled without voids into the metal mold, but the obtained molded product had apparent deficits such as weld and sink marks, and "C": the thermoplastic elastomer composition was not completely filled without voids into the metal mold.

(10) Molding Fluidity (Spiral Flow Length (SFD))

The thermoplastic elastomer composition was injected into a metal mold cavity of a spiral flow metal mold having a thickness of 1 mm, a width of 10 mm, a gate diameter of 4.5 mm, and a gate thickness of 1 mm, and the flow length (spiral flow length) was measured. As an injection molding machine, an "SH100" made by Sumitomo Heavy Industries, Ltd. was used. The molding condition was the temperature of the resin: 230° C., the temperature of the metal mold: 60° C., the injection time: 10 seconds, the injection rate: 40%, the back pressure: 10%, the number of rotation of the screw: 100 rpm, and the injection pressure of 100 MPa.

(11) Evaluation of Appearance (Flow Marks)

The appearance of the flat plate obtained in (9) was evaluated.

"A": no flow marks was found in visual observation,
"B": the slight flow mark was found in visual observation, and
"C": the apparent flow mark was found in visual observation.

(12) Stickiness

The stickiness of the molded product (flat plate) obtained in (9) was evaluated based on the determination criterion.

"S": the obtained molded product had no stickiness,
"A": the obtained molded product had slight stickiness, but has no problem in practical use,
"B": the obtained molded product had stickiness, and was not suitable for practical use, and
"C": the obtained molded product had remarkable stickiness.

(13) Evaluation of Feeling

The feeling of the molded product (flat plate) obtained in (9) was evaluated.

The feeling was evaluated blind (a method for evaluation in which the evaluation was made only based on a feeling without adding a feeling obtained from the sense of sight such as "looks moist" and "looks soft"), and the touch when the sample was touched with a palm of a hand was evaluated in five grades. The touch of the surface material formed of the olefin thermoplastic elastomer (TPO) in the conventional art (made by KYOWA LEATHER CLOTH CO., LTD., surface material produced by vacuum drawing) was defined as a reference point (three points). The same touch as that was evaluated as three (3) points, a touch better than that was evaluated as four (4) points, a touch much better than that was evaluated as five (5) points, a touch little inferior to that was evaluated as two (2) points, and a touch very inferior to that was evaluated as one (1) point.

(14) Resistance to Wear

The resistance to wear of the molded product (flat plate) obtained in (9) was evaluated.

The resistance to wear was evaluated using a Color Fastness Rubbing Tester (made by TESTER SANGYO CO., LTD., "AB-301") based on the number of times of reciprocal motion until the leather texture on the surface of the molded product was lost by wear. The evaluation condition was as follows:
temperature condition: under an atmosphere of 23° C. stroke: 120 mm
frequency: 1 round/2 sec
load: 1 kg
rubbing object: a 100% cotton cloth, Kanakin No. 3 (according to JIS L0803) was folded into three and attached
contact area: 1 cm$^2$

(15) Molding of Instrument Panel Surface Material (Molding of Instrument Panel)

Figure 3:
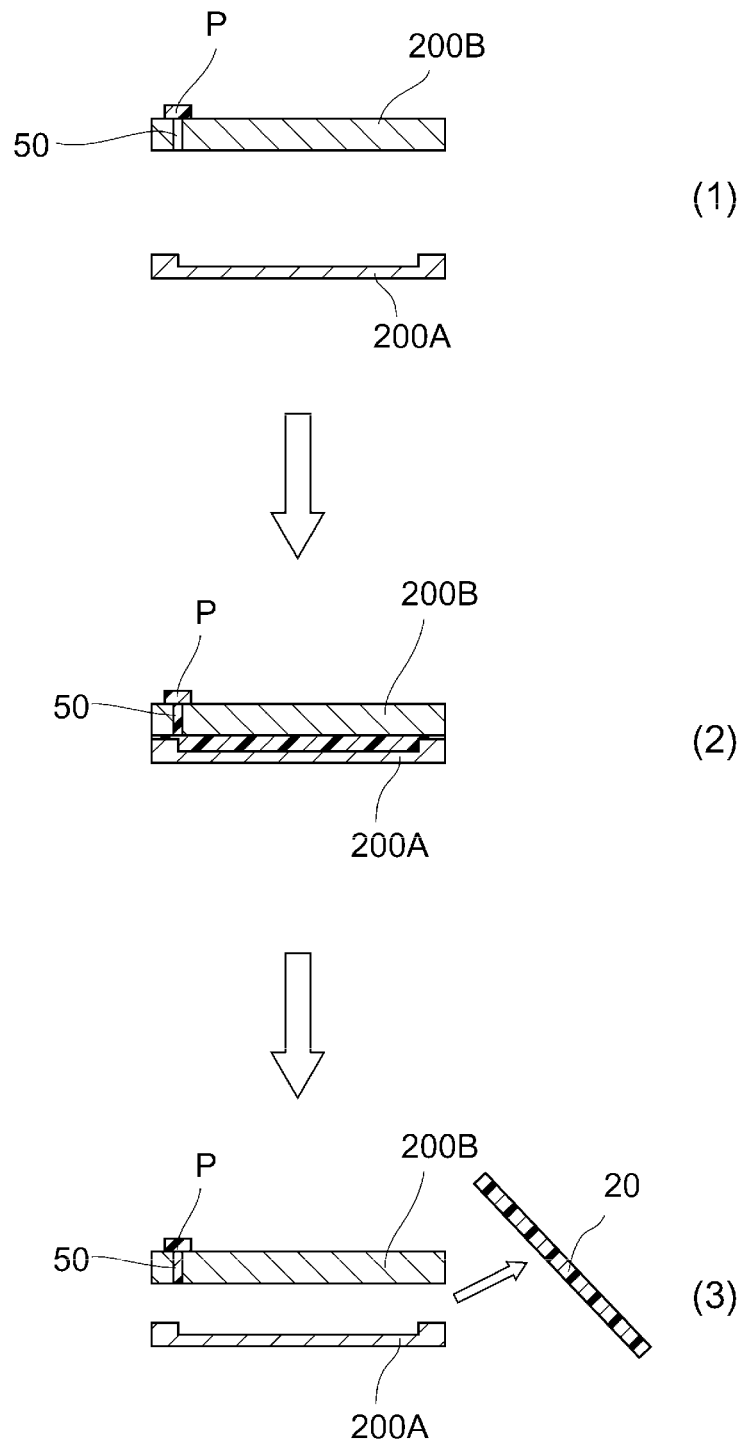
FIG. 3 shows a schematic view showing a procedure of a method for producing a surface material 20 in Examples.

Using the thermoplastic elastomer compositions in Examples 1 to 7 and Comparative Examples 1 to 5, an instrument panel surface material (hereinafter, simply referred to as a "surface material" in some cases) were produced, and the properties were evaluated. First, a method for producing a surface material will be described with reference to FIG. 3. FIG. 3 shows a schematic view showing a procedure of a method for producing an instrument panel surface material (surface material) 20. First, a metal mold for forming a surface material surface side (hereinafter, referred to as a "front side metal mold") 200A and a metal mold for forming a surface material rear surface (hereinafter, referred to as a "rear side metal mold") 200B were produced as follows (see (1) in FIG. 3). A genuine leather for inversion (300 mm×400 mm) was prepared and an inverted model thereof was produced. Based on the model, an electroplated plate as the front side metal mold 200A was produced. Then, a rear side metal mold 200B was produced so as to have a shape that ensured a predetermined thickness by fitting the rear side metal mold 200B and the electroplated plate (front side metal mold 200A) together.

Subsequently, the front side metal mold 200A and the rear side metal mold 200B were fitted together, and a thermoplastic elastomer composition P was filled into the cavity (see (2) in FIG. 3). The front side metal mold 200A and the rear side metal mold 200B were designed such that the thickness of the cavity formed therebetween when these metal molds were fitted together was 1 mm. The fitted metal molds were heated to 60° C., and the molten thermoplastic elastomer composition P was poured and filled into the cavity from a runner 50. Subsequently, the thermoplastic elastomer composition P filled into the cavity between the front side metal mold 200A and the rear side metal mold 200B was removed to obtain a surface material 20 (see (3) in FIG. 3).

The stickiness and feeling of the obtained surface material 20 was evaluated according to the evaluation method. The moldability of the obtained surface material 20 was evaluated based on the following determination criterion:

"S": the thermoplastic elastomer composition can be completely filled without voids into the metal mold, and the obtained molded product has no appearance deficit,
"A": the thermoplastic elastomer composition was completely filled without voids into the metal mold, but the obtained molded product had slight weld or sink marks,
"B": the thermoplastic elastomer composition was completely filled without voids into the metal mold, but the obtained molded product had apparent deficits such as weld and sink marks, and
"C": the thermoplastic elastomer composition was not completely filled without voids into the metal mold.

Figure 4:
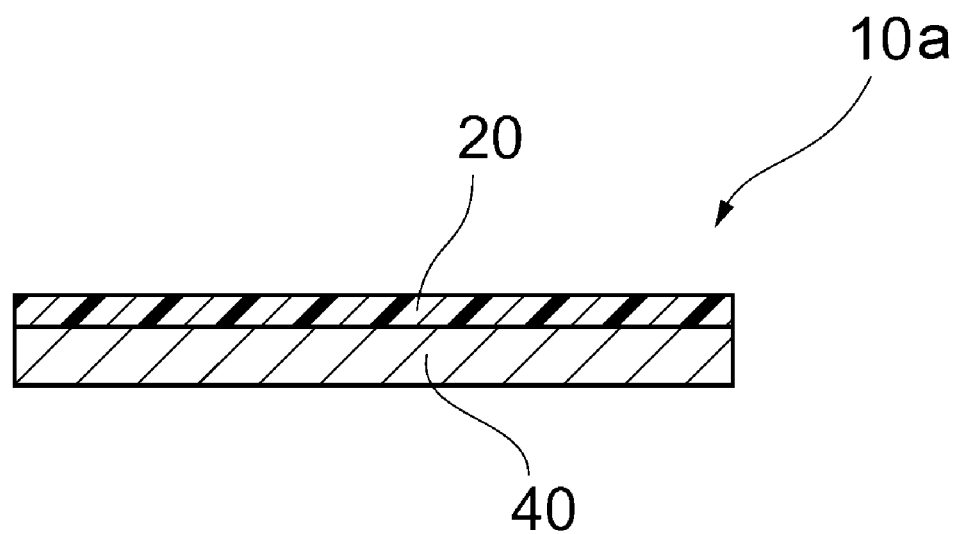
FIG. 4 shows a schematic sectional view of a laminate 10a having a two-layer structure and produced in Examples.
Figure 5:
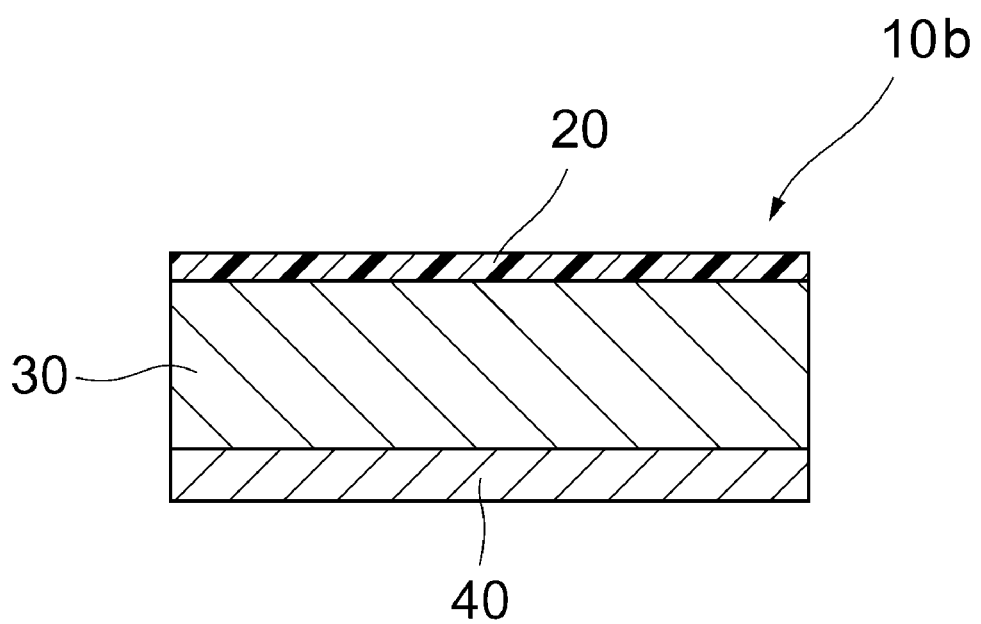
FIG. 5 shows a schematic sectional view of laminate 10b having a three-layer structure and produced in Examples.

Further, using each of the surface materials 20 in Examples 1 to 7, a laminate 10a having a two-layer structure (see FIG. 4) and a laminate 10b having a three-layer structure (see FIG. 5) were produced. FIG. 4 shows a schematic sectional view showing the laminate 10a having a two-layer structure, and FIG. 5 shows a schematic sectional view showing the laminate 10b having a three-layer structure. In a method for producing the laminate 10a, a core material 40 (made by Japan Polypropylene Corporation, talc-added block polypropylene (melt flow rate on the condition of 230° C. and a load of 2.16 kg: 33 g/10 min, thickness of 3.5 mm)) was formed in advance. The core material 40 was disposed within the metal mold, and integrally molded with the surface material 20 to obtain the laminate 10a having a two-layer structure (see FIG. 4). Moreover, a foaming material 30 (made by BASF INOAC Polyurethanes Ltd., thermosetting semi-hard urethane foam, trade name "Formlite RM," density of 180 kg/m³, thickness of 8 mm) was interposed between the surface material 20 and the core material 40 and molded integrally to obtain the laminate 10b having a three-layer structure (see FIG. 5). The laminate 10b took advantage of a softer touch feeling of the surface material 20.

(16) Comprehensive Determination

Comprehensive determination was comprehensively made considering the evaluations above. The score in the comprehensive determination when the requirements as an automobile part could be satisfied was defined as the reference point (three (3) points). When a comprehensive determination was better than the reference, four (4) points were given, and when the comprehensive determination was much better than the reference, five (5) points were given. When the comprehensive determination was little inferior to the reference, two (2) points were given. When the comprehensive determination was very inferior to the reference, one (1) point was given.

Hereinafter, the compositions and physical properties in Examples and Comparative Examples were shown in Table 1 to Table 5.

TABLE 1

| (units: parts by mass) | | Example 1 | Example 2 | Example 3 | Example 4 | Example 5 | Example 6 | Example 7 |
|---|---|---|---|---|---|---|---|---|
| (A) | PP | 100 | 100 | 100 | 100 | 100 | 100 | 100 |
| (B) | (B-1) + (B-2) + (B-3) | 125 | 145 | 115 | 125 | 125 | 155 | 125 |
| (B-1) | Rubber 1 | 40 | 60 | 30 | 40 | 40 | 50 | 40 |
| (B-2) | Rubber 2 | 15 | 15 | 15 | 15 | 15 | 20 | 15 |
| (B-3) | Rubber 3 | 70 | 70 | 70 | 70 | 70 | 85 | 70 |
| (C) | Softening agent | 180 | 180 | 180 | 180 | 180 | 240 | 120 |
| (D) | Polyorganosiloxane-1 | 10 | 10 | 10 | 10 | 10 | 10 | 10 |
| (E) | Rubber 8 | 60 | 60 | 60 | 60 | 60 | 75 | 60 |
| (F) | Organic peroxide | 4 | 4 | 4 | 2.5 | 5 | 5 | 4 |
| Content of styrene | (% by mass) | 49 | 47 | 50 | 49 | 49 | 49 | 49 |
| MFR | 230° C., 2.16 kg | 210 | 210 | 220 | 150 | 250 | 250 | 180 |
| | 230° C., 1.2 kg | 57 | 57 | 60 | 41 | 68 | 68 | 49 |
| Hardness | JIS-A | 77 | 80 | 75 | 77 | 77 | 65 | 85 |
| Compression set | 100° C., 22 hr, (%) | 42 | 45 | 40 | 42 | 42 | 33 | 51 |
| Low temperature properties | Tensile elongation at −30° C. (%) | 205 | 210 | 200 | 200 | 150 | 120 | 100 |
| Weight average molecular weight of component (A) after crosslinking $M_w(\times 10^4)$ | | 11 | 11 | 12 | 8 | 13 | 13 | 9 |
| Tensile strength | (MPa) | 6 | 6.5 | 6 | 6.5 | 4 | 4 | 7 |
| Tensile elongation | (%) | 215 | 230 | 180 | 190 | 150 | 150 | 180 |
| Melt viscosity | Capillary rheometer, 100/sec (Pa · sec) | 67 | 67 | 62 | 93 | 49 | 49 | 80 |
| | Capillary rheometer, 1000/sec (Pa · sec) | 22 | 22 | 21 | 26 | 19 | 19 | 24 |
| Molding of instrument panel | | S | S | S | A | A | A | S |
| Stickiness | | S | A | S | S | S | A | S |
| Feeling | | 4 | 3 | 4 | 4 | 4 | 5 | 3 |
| Total determination | | 5 | 4 | 4 | 4 | 4 | 3 | 3 |

TABLE 2

| (units: parts by mass) | | Comparative Example 1 | Comparative Example 2 | Comparative Example 3 | Comparative Example 4 | Comparative Example 5 |
|---|---|---|---|---|---|---|
| (A) | PP | 100 | 100 | 100 | 100 | 100 |
| (B) | (B-1) + (B-2) + (B-3) | 100 | 125 | 125 | 250 | 145 |
| (B-1) | Rubber 1 | 10 | 40 | 40 | 80 | 60 |
| (B-2) | Rubber 2 | 15 | 15 | 15 | 30 | 15 |
| (B-3) | Rubber 3 | 75 | 70 | 70 | 140 | 70 |
| (C) | Softening agent | 130 | 180 | 180 | 300 | 90 |
| (D) | Polyorganosiloxane-1 | 10 | 10 | 10 | 7 | 7 |
| (E) | Rubber 8 | 75 | 60 | 60 | 120 | 60 |
| (F) | Organic peroxide | 4 | 1.5 | 7 | 5 | 4 |
| Content of styrene | (% by mass) | 53 | 49 | 49 | 49 | 47 |
| MFR | 230° C., 2.16 kg | 185 | 100 | 320 | 300 | 180 |
| | 230° C., 1.2 kg | 50 | 27 | 87 | 82 | 49 |
| Hardness | JIS-A | 84 | 77 | 77 | 55 | 95 |
| Compression set | 100° C., 22 hr, (%) | 49 | 42 | 42 | 26 | 75 |
| Low temperature properties | Tensile elongation at −30° C. (%) | 30 | 180 | 100 | 40 | 25 |
| Weight average molecular weight of component (A) after crosslinking $M_w(\times 10^4)$ | | 10 | 4 | 21 | 16 | 9 |
| Tensile strength | (MPa) | 6.5 | 6 | 4 | 3.5 | 7.5 |
| Tensile elongation | (%) | 180 | 180 | 170 | 220 | 150 |
| Melt viscosity | Capillary rheometer, 100/sec (Pa · sec) | 78 | 224 | 17 | 27 | 80 |
| | Capillary rheometer, 1000/sec (Pa · sec) | 24 | 43 | 8 | 15 | 24 |

TABLE 2-continued

| (units: parts by mass) | Comparative Example 1 | Comparative Example 2 | Comparative Example 3 | Comparative Example 4 | Comparative Example 5 |
|---|---|---|---|---|---|
| Molding of instrument panel | A | C | B | A | S |
| Stickiness | S | S | S | C | S |
| Feeling | 2 | 4 | 4 | 2 | 2 |
| Total determination | 2 | 1 | 1 | 1 | 1 |

TABLE 3

| | (units: parts by mass) | Example 8 | Example 9 | Example 10 | Example 11 | Example 12 |
|---|---|---|---|---|---|---|
| (A) | PP | 100 | 100 | 100 | 100 | 100 |
| (B) | (B-3) + (B-4) + (B-5) + (B-6) + (B-7) | 150 | 120 | 180 | 150 | 150 |
| (B)-3 | Rubber 3 | 150 | 120 | 180 | 0 | 80 |
| (B)-4 | Rubber 4 | 0 | 0 | 0 | 150 | 70 |
| (B)-5 | Rubber 5 | 0 | 0 | 0 | 0 | 0 |
| (B)-6 | Rubber 6 | 0 | 0 | 0 | 0 | 0 |
| (B)-7 | Rubber 7 | 0 | 0 | 0 | 0 | 0 |
| (C) | Softening agent | 180 | 180 | 180 | 180 | 180 |
| (D) | Polyorganosiloxane-1 | 10 | 10 | 10 | 10 | 10 |
| (D) | Polyorganosiloxane-2 | 0 | 0 | 0 | 0 | 0 |
| (E) | Rubber 9 | 0 | 0 | 0 | 0 | 0 |
| (F) | Organic peroxide | 4 | 4 | 4 | 4 | 4 |
| Content of styrene | (% by mass) | 53 | 53 | 53 | 42 | 48 |
| MFR | 230° C., 1.2kg (g/10 min.) | 55 | 62 | 48 | 51 | 53 |
| Hardness | JISA | 75 | 80 | 70 | 70 | 73 |
| Compression set | 100° C., 22 hr (%) | 40 | 45 | 36 | 36 | 38 |
| Low temperature properties | Tensile elongation at −30° C. (%) | 150 | 100 | 150 | 110 | 170 |
| tanδ peak temperature of component (B) (° C.) | | −11 | −11 | −11 | 20 | −11 |
| tanδ peak temperature of composition (° C.) | | −13 | −13 | −13 | 17 | −13 |
| Weight average molecular weight of component (A) after crosslinking $M_w (\times 10^4)$ | | 14 | 15 | 12 | 13 | 13 |
| Tensile strength | (MPa) | 6.5 | 7.2 | 6.2 | 6.5 | 7 |
| Tensile elongation | (%) | 120 | 110 | 160 | 120 | 180 |
| Melt viscosity | Capillary rheometer, 100/sec (Pa · sec) | 70 | 59 | 82 | 77 | 74 |
| | Capillary rheometer, 1000/sec (Pa · sec) | 23 | 21 | 25 | 24 | 23 |
| Injection molding properties | 2 mmt × 1000 cm² Flat plate | S | S | S | A | A |
| Molding fluidity | 1 mmt, 230° C./60° C., 87 MPa Spiral flow length (mm) | 900 | 930 | 870 | 880 | 890 |
| Appearance (flow marks) | | A | A | A | A | A |
| Stickiness | | S | A | S | S | S |
| Feeling | | 4 | 4 | 4 | 4 | 4 |
| Resistance to wear (units: number of times) | | 30000 | 28000 | 26000 | 29000 | 27000 |
| Total determination | | 5 | 5 | 5 | 4 | 4 |

TABLE 4

| | (units: parts by mass) | Example 13 | Example 14 | Example 15 | Example 16 | Example 17 |
|---|---|---|---|---|---|---|
| (A) | PP | 100 | 100 | 100 | 100 | 100 |
| (B) | (B-3) + (B-4) + (B-5) + (B-6) + (B-7) | 150 | 150 | 150 | 150 | 150 |
| (B)-3 | Rubber 3 | 150 | 0 | 0 | 150 | 0 |
| (B)-4 | Rubber 4 | 0 | 0 | 0 | 0 | 0 |
| (B)-5 | Rubber 5 | 0 | 150 | 0 | 0 | 0 |
| (B)-6 | Rubber 6 | 0 | 0 | 150 | 0 | 0 |
| (B)-7 | Rubber 7 | 0 | 0 | 0 | 0 | 150 |
| (C) | Softening agent | 180 | 180 | 180 | 180 | 180 |
| (D) | Polyorganosiloxane-1 | 10 | 10 | 10 | 0 | 10 |
| (D) | Polyorganosiloxane-2 | 0 | 0 | 0 | 10 | 0 |
| (E) | Rubber 9 | 60 | 0 | 0 | 0 | 0 |
| (F) | Organic peroxide | 4 | 4 | 4 | 4 | 4 |
| Content of styrene | (% by mass) | 53 | 40 | 72 | 53 | 31 |

TABLE 4-continued

| (units: parts by mass) | | Example 13 | Example 14 | Example 15 | Example 16 | Example 17 |
|---|---|---|---|---|---|---|
| MFR | 230° C., 1.2 kg (g/10 min.) | 50 | 50 | 62 | 56 | 51 |
| Hardness | JISA | 76 | 73 | 75 | 76 | 80 |
| Compression set | 100° C., 22 hr (%) | 41 | 38 | 40 | 41 | 45 |
| Low temperature properties | Tensile elongation at −30° C. (%) | 120 | 150 | 100 | 100 | 180 |
| tanδ peak temperature of component (B) (° C.) | | −11 | −25 | 39 | −11 | −34 |
| tanδ peak temperature of composition (° C.) | | −13 | −25 | 36 | −13 | −37 |
| Weight average molecular weight of component (A) after crosslinking Mw($\times 10^4$) | | 12 | 12 | 15 | 13 | 13 |
| Tensile strength | (MPa) | 7.4 | 7.2 | 6.2 | 7.2 | 6.1 |
| Tensile elongation | (%) | 130 | 110 | 160 | 110 | 190 |
| Melt viscosity | Capillary rheometer, 100/sec (Pa·sec) | 78 | 78 | 59 | 69 | 77 |
| | Capillary rheometer, 1000/sec (Pa·sec) | 24 | 24 | 21 | 22 | 24 |
| Injection molding properties | 2 mmt × 1000 cm² Flat plate | A | A | A | S | A |
| Molding fluidity | 1 mmt, 230° C./60° C., 87 MPa Spiral flow length (mm) | 880 | 880 | 930 | 900 | 880 |
| Appearance (flow marks) | | A | A | A | A | A |
| Stickiness | | A | S | S | S | A |
| Feeling | | 5 | 4 | 4 | 4 | 4 |
| Resistance to wear (units: number of times) | | 25000 | 23000 | 25000 | 20000 | 20000 |
| Total determination | | 4 | 4 | 4 | 4 | 4 |

TABLE 5

| (units: parts by mass) | | Comparative Example 6 | Comparative Example 7 | Comparative Example 8 | Comparative Example 9 | Comparative Example 10 | Comparative Example 11 |
|---|---|---|---|---|---|---|---|
| (A) | PP | 100 | 100 | 100 | 100 | 100 | 100 |
| (B) | (B-3) + (B-4) + (B-5) + (B-6) + (B-7) | 70 | 210 | 150 | 150 | 150 | 150 |
| (B)-3 | Rubber 3 | 40 | 120 | 150 | 150 | 150 | 150 |
| (B)-4 | Rubber 4 | 30 | 90 | 0 | 0 | 0 | 0 |
| (B)-5 | Rubber 5 | 0 | 0 | 0 | 0 | 0 | 0 |
| (B)-6 | Rubber 6 | 0 | 0 | 0 | 0 | 0 | 0 |
| (B)-7 | Rubber 7 | 0 | 0 | 0 | 0 | 0 | 0 |
| (C) | Softening agent | 180 | 180 | 180 | 180 | 180 | 180 |
| (D) | Polyorganosiloxane-1 | 10 | 10 | 3 | 23 | 10 | 10 |
| (D) | Polyorganosiloxane-2 | 0 | 0 | 0 | 0 | 0 | 0 |
| (E) | Rubber 9 | 0 | 0 | 0 | 0 | 0 | 0 |
| (F) | Organic peroxide | 4 | 4 | 4 | 4 | 1 | 7 |
| Content of styrene | (% by mass) | 48 | 48 | 53 | 53 | 53 | 53 |
| MFR | 230° C., 1.2 kg (g/10 min.) | 77 | 43 | 58 | 51 | 30 | 90 |
| Hardness | JISA | 92 | 55 | 71 | 79 | 72 | 78 |
| Compression set | 100° C., 22 hr (%) | 72 | 28 | 37 | 44 | 38 | 43 |
| Low temperature properties | Tensile elongation at −30° C. (%) | 70 | 180 | 105 | 110 | 120 | 100 |
| tanδ peak temperature of component (B) (° C.) | | −11 | −11 | −11 | −11 | −11 | −11 |
| tanδ peak temperature of composition (° C.) | | −13 | −13 | −13 | −13 | −13 | −13 |
| Weight average molecular weight of component (A) after crosslinking $M_w$($\times 10^4$) | | 12 | 14 | 13 | 13 | 23 | 4.5 |
| Tensile strength | (MPa) | 7.5 | 6.1 | 6.8 | 6.5 | 7.4 | 7.2 |
| Tensile elongation | (%) | 70 | 190 | 120 | 120 | 130 | 110 |
| Melt viscosity | Capillary rheometer, 100/sec (Pa·sec) | 35 | 90 | 66 | 77 | 210 | 14 |
| | Capillary rheometer, 1000/sec (Pa·sec) | 17 | 26 | 22 | 24 | 59 | 8 |
| Injection molding properties | 2 mmt × 1000 cm² Flat plate | S | A | S | S | C | B |

TABLE 5-continued

| (units: parts by mass) | | Comparative Example 6 | Comparative Example 7 | Comparative Example 8 | Comparative Example 9 | Comparative Example 10 | Comparative Example 11 |
|---|---|---|---|---|---|---|---|
| Molding fluidity | 1 mmt, 230° C./60° C., 87 MPa Spiral flow length (mm) | 1000 | 850 | 910 | 880 | 790 | 1060 |
| Appearance (flow marks) | | A | B | A | A | C | A |
| Stickiness | | A | B | S | A | S | S |
| Feeling | | 2 | 3 | 4 | 2 | 3 | 3 |
| Resistance to wear (units: number of times) | | 22000 | 22000 | 4000 | 28000 | 24000 | 20000 |
| Total determination | | 2 | 2 | 2 | 2 | 1 | 2 |

Apparently from Tables 1 to 5, the instrument panels obtained from the thermoplastic elastomer compositions in Examples 1 to 7 had a good feeling and appearance, and sufficiently satisfied the requirements as the automobile interior material. Moreover, comprehensive determinations for Examples 1 to 7 were good. Accordingly, it was found that the thermoplastic elastomer compositions in Examples 1 to 7 have high molding fluidity, mechanical physical properties, and resistance to wear and providing a good appearance and feeling, which were required as the automobile interior material. Meanwhile, it was found that no practically usable instrument panel was obtained from the thermoplastic elastomer compositions in Comparative Examples 1 to 5, and the comprehensive determination was poor.

It was also found that the thermoplastic elastomer compositions in Examples 8 to 17 have high molding fluidity, mechanical physical properties, and resistance to wear and providing a good appearance and feeling, and satisfy the requirements as the automobile interior material such as the instrument panel. Meanwhile, it was found that in the thermoplastic elastomer compositions in Comparative Examples 6 to 11, one of the physical properties was inferior, and the comprehensive determination was poor.

The present application is based on Japanese Patent Application (No. 2010-132285) which was filed with the Japan Patent Office on Jun. 9, 2010, the contents of which are incorporated herein by reference.

INDUSTRIAL APPLICABILITY

The thermoplastic elastomer composition according to the present invention and the molded products using the same can be suitably used as an automobile interior member and the like. More specifically, the thermoplastic elastomer composition can be suitably used as the surface material for instrument panels, door panels, and glove box doors, and has industrial applicability.

REFERENCE SIGNS LIST

1 . . . instrument panel, 12 . . . upper portion, 14 . . . pad portion, 16 . . . lower portion, 142 . . . automobile surface material layer (surface material layer), 144 . . . foaming material layer, 146 . . . core material layer, 200A . . . metal mold for forming surface material surface side (front side metal mold), 200B . . . metal mold for forming surface material rear surface (rear side metal mold), 10a, 10b . . . laminate, 20 . . . instrument panel surface material (surface material), 30 . . . foaming material, 40 . . . core material, 50 . . . runner

The invention claimed is:

1. A thermoplastic elastomer composition obtained by crosslinking a composition comprising components (A) to (D) below:

(A) 100 parts by mass of a polypropylene-based resin,
(B) from 80 to 200 parts by mass of a hydrogenated product of a block copolymer having at least one block mainly including a conjugated diene monomer unit and at least one block mainly including a vinyl aromatic monomer unit,
(C) from 100 to 250 parts by mass of a softening agent, and
(D) from 5 to 20 parts by mass of polyorganosiloxane, the thermoplastic elastomer composition satisfying conditions (1) to (7) below:
(1) a content of the vinyl aromatic monomer unit in the component (B) is from 30 to 80% by mass,
(2) a melt flow rate (MFR) measured according to ASTM D1238 at 230° C. with load of 1.2 kg is from 35 to 85 g/10 min,
(3) a Japanese Industrial Standard (JIS) A hardness is from 60 to 90,
(4) a compression set measured according to JIS K6262 at 100° C. for 22 hours is from 30 to 70%,
(5) a tensile elongation at −30° C. is not less than 80%,
(6) a melt viscosity at a shear rate of 100/sec measured by a capillary rheometer is from 30 to 200 Pa·sec, and
(7) a melt viscosity at a shear rate of 1000/sec measured by a capillary rheometer is from 10 to 40 Pa·sec,
wherein as a measurement condition of the melt viscosity measured by a capillary rheometer on the conditions (6) and (7), heating temperature is 230° C., cylinder diameter is 9.55 mm, orifice diameter is 1.0 mmϕ, and orifice length is 10 mm.

2. The thermoplastic elastomer composition according to claim 1, wherein at least one tan δ peak temperature of the thermoplastic elastomer composition measured by dynamic viscoelastic analysis exits in the range of −25 to 40° C.

3. The thermoplastic elastomer composition according to claim 1, wherein the component (A) in the thermoplastic elastomer composition obtained by crosslinking has a weight average molecular weight, measured by gel permeation chromatography (GPC) using o-dichlorobenzene as a solvent, in the range of $5.0 \times 10^4$ to $2.0 \times 10^5$ in terms of polystyrene.

4. The thermoplastic elastomer composition according to claim 1, wherein the component (D) has a kinematic viscosity at 25° C. specified in JIS Z8803 of not less than 5000 cSt.

5. The thermoplastic elastomer composition according to claim 1, wherein the block mainly including a conjugated diene monomer unit in the component (B) is a copolymer block mainly including a conjugated diene monomer unit and including a vinyl aromatic monomer unit.

6. The thermoplastic elastomer composition according to claim 1, further comprising from 40 to 80 parts by mass of an ethylene.α-olefin-based copolymer including an ethylene unit and a unit of α-olefin having 3 to 20 carbon atoms.

7. An injection molded product, comprising the thermoplastic elastomer composition according to claim 1.

8. A sheet comprising the injection molded product according to claim 7.

9. An automobile interior material comprising the injection molded product according to claim 7.

10. The automobile interior material according to claim 9, wherein an average thickness is not more than 2 mm, and a surface area is not less than 1000 cm$^2$.

11. A laminate, comprising a layer including the automobile interior material according to claim 9, and
a layer including a core material, laminated on the layer including the automobile interior material, wherein
the core material is at least one selected from the group consisting of polypropylene, acrylonitrile.butadiene.styrene (ABS) resin, polycarbonate/acrylonitrile.butadiene.styrene alloy (PC/ABS alloy), and modified polyphenylene ether resin.

12. The laminate according to claim 11, further comprising a layer including a foaming material provided between the layer including the automobile interior material and the layer including a core material.

13. An instrument panel, comprising the laminate according to claim 11.

14. The thermoplastic elastomer composition according to claim 1, wherein the thermoplastic elastomer composition comprises from 90 to 170 parts by mass of the hydrogenated product of a block copolymer.

15. The thermoplastic elastomer composition according to claim 1, wherein the thermoplastic elastomer composition comprises from 150 to 200 parts by mass of the softening agent.

16. The thermoplastic elastomer composition according to claim 1, wherein the thermoplastic elastomer composition comprises from 8 to 15 parts by mass of said polyorganosiloxane.

17. A thermoplastic elastomer composition obtained by crosslinking a composition comprising components (A) to (D) below:
(A) 100 parts by mass of a polypropylene-based resin,
(B) from 80 to 200 parts by mass of a hydrogenated product of a block copolymer having at least one block mainly including a conjugated diene monomer unit and at least one block mainly including a vinyl aromatic monomer unit,
(C) from 100 to 250 parts by mass of a softening agent, and
(D) from 5 to 20 parts by mass of polyorganosiloxane,
the thermoplastic elastomer composition satisfying conditions (1) to (6) below:
(1) a content of the vinyl aromatic monomer unit in the component (B) is from 30 to 80% by mass,
(2) a melt flow rate (MFR) measured according to ASTM D1238 at 230° C. with load of 1.2 kg is from 35 to 85 g/10 min,
(3) a Japanese Industrial Standard (JIS) A hardness is from 60 to 90,
(4) a compression set measured according to JIS K6262 at 100° C. for 22 hours is from 30 to 70%,
(5) a tensile elongation at −30° C. is not less than 80%, and
(6) a melt viscosity at a shear rate of 100/sec measured by a capillary rheometer is from 30 to 200 Pa·sec, wherein as a measurement condition of the melt viscosity measured by a capillary rheometer, a heating temperature is 230° C., a cylinder diameter is 9.55 mm, an orifice diameter is 1.0 mmϕ, and an orifice length is 10 mm.

18. A thermoplastic elastomer composition obtained by crosslinking a composition comprising components (A) to (D) below:
(A) 100 parts by mass of a polypropylene-based resin,
(B) from 80 to 200 parts by mass of a hydrogenated product of a block copolymer having at least one block mainly including a conjugated diene monomer unit and at least one block mainly including a vinyl aromatic monomer unit,
(C) from 100 to 250 parts by mass of a softening agent, and
(D) from 5 to 20 parts by mass of polyorganosiloxane,
the thermoplastic elastomer composition satisfying conditions (1) to (6) below:
(1) a content of the vinyl aromatic monomer unit in the component (B) is from 30 to 80% by mass,
(2) a melt flow rate (MFR) measured according to ASTM D1238 at 230° C. with load of 1.2 kg is from 35 to 85 g/10 min,
(3) a Japanese Industrial Standard (JIS) A hardness is from 60 to 90,
(4) a compression set measured according to JIS K6262 at 100° C. for 22 hours is from 30 to 70%,
(5) a tensile elongation at −30° C. is not less than 80%, and
(6) a melt viscosity at a shear rate of 1000/sec measured by a capillary rheometer is from 10 to 40 Pa·sec, wherein as a measurement condition of the melt viscosity measured by a capillary rheometer, a heating temperature is 230° C., a cylinder diameter is 9.55 mm, an orifice diameter is 1.0 mmϕ, and an orifice length is 10 mm.

\* \* \* \* \*